US009781485B2

(12) United States Patent
Russell

(10) Patent No.: US 9,781,485 B2
(45) Date of Patent: *Oct. 3, 2017

(54) DISTRIBUTED PLAYBACK ARCHITECTURE

(71) Applicant: Cinemo GmbH, Karlsruhe (DE)

(72) Inventor: Ivan Russell, Karlsruhe (DE)

(73) Assignee: Cinemo GmbH, Karlsruhe (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/266,882

(22) Filed: Sep. 15, 2016

(65) Prior Publication Data

US 2017/0006352 A1   Jan. 5, 2017

Related U.S. Application Data

(63) Continuation of application No. 13/861,669, filed on Apr. 12, 2013, now Pat. No. 9,538,254, which is a
(Continued)

(51) Int. Cl.
*H04N 21/231* (2011.01)
*H04N 21/6332* (2011.01)
(Continued)

(52) U.S. Cl.
CPC ..... *H04N 21/6332* (2013.01); *H04N 21/4122* (2013.01); *H04N 21/41407* (2013.01);
(Continued)

(58) Field of Classification Search
CPC .............................................. H04N 21/23106
(Continued)

(56) References Cited

U.S. PATENT DOCUMENTS 9,538,254 B2 * 1/2017 Russell ............. H04N 7/17318
725/93
2003/0093803 A1 * 5/2003 Ishikawa ........... H04N 7/17318
725/94
(Continued)

FOREIGN PATENT DOCUMENTS

EP          2164222      3/2010
WO       2009029339      3/2009

OTHER PUBLICATIONS

Jang, J et al., "A Study of the MOST150/Ethernet Gateway of In-Vehicle Network", IJCSNS International Journal of Computer Science and Network Security. Vo. 10, No. 9., Sep. 2010, 62-65.
(Continued)

*Primary Examiner* — Hunter B Lonsberry
(74) *Attorney, Agent, or Firm* — Michael A. Glenn; Perkins Coie LLP

(57) ABSTRACT

Master element for a distributed playback architecture for a media data, having: a payload data source for providing payload data packets; a beacon packet creator for creating beacon packets useable for synchronizing a playback process of the payload data packets at, at least one, slave element in the distributed playback architecture; and a network interface for transmitting an interleaved packet stream to the at least one slave element, the interleaved packet stream having the payload data packets provided by the payload data source and the beacon packets created by the beacon packet creator. A corresponding slave element, the distributed playback architecture, a method, and a computer program product are also disclosed.

13 Claims, 13 Drawing Sheets

Related U.S. Application Data continuation of application No. PCT/EP2011/064218, filed on Aug. 18, 2011.

(60) Provisional application No. 61/393,570, filed on Oct. 15, 2010.

(51) Int. Cl.
   *H04N 21/41* (2011.01)
   *H04N 21/414* (2011.01)
   *H04N 21/43* (2011.01)
   *H04N 21/436* (2011.01)
   *H04N 21/442* (2011.01)

(52) U.S. Cl.
   CPC ..... *H04N 21/4305* (2013.01); *H04N 21/4307* (2013.01); *H04N 21/43615* (2013.01); *H04N 21/44227* (2013.01)

(58) Field of Classification Search
   USPC .............................................. 725/93–95, 133
   See application file for complete search history.

(56) References Cited

U.S. PATENT DOCUMENTS

| | | |
|---|---|---|
| 2005/0166135 A1 | 7/2005 | Burke et al. |
| 2006/0036356 A1 | 2/2006 | Rasin et al. |
| 2007/0140187 A1 | 6/2007 | Rokusek et al. |
| 2008/0037571 A1 | 2/2008 | Hetzel et al. |
| 2008/0259966 A1* | 10/2008 | Baird .................... H04J 3/0632 370/503 |
| 2009/0010283 A1 | 1/2009 | Lin et al. |

OTHER PUBLICATIONS

Kang, S et al., "Time Synchronization and Resource Reservation for Time-Sensitive Applications in Bridges Local Area Networks", Sixth International Conference on Advanced Language Processing and Web Information Technology. IEEE. Piscataway., 2007, 364-369.

Schirling, P et al., "MPEG-2 Systems White Paper—Multiplexing and Schnronization", ISO/IEC JTC 1/SC 29/WG 11 N7680. MPEG Meeting. Nice., Oct. 2005, 4 Pages.

Schopp, H , "MOST150: The new Infotainment Backbone for Automotive Applications", MOST Forum., Sep. 30, 2008, 30 Pages.

* cited by examiner

DISTRIBUTED PLAYBACK ARCHITECTURE

CROSS-REFERENCE TO RELATED APPLICATIONS

This application is a continuation of copending U.S. patent application Ser. No. 13/861,669, filed Apr. 12, 2013, which is a continuation of International Application No. PCT/EP2011/064218, filed Aug. 18, 2011, and additionally claims priority from US Application No. 61/393,570 filed Oct. 15, 2010, all of which are incorporated herein by reference in their entirety.

BACKGROUND OF THE INVENTION

The field of the present invention is related to systems and methods for playing back media data, and in particular to a master element for a distributed playback architecture, a slave element for the distributed playback architecture, a method for a synchronized playback in the distributed playback architecture and a computer readable digital storage medium usable for causing a processor to perform the method for synchronized playback.

Distributed playback enables the synchronized presentation and interactive control of linear multimedia content by multiple devices over a relatively low bandwidth network. The bandwidth of the network is considered to be relatively low when it would be insufficient for transmitting the entire amount of data that shall ultimately be presented at the various terminals. In other words, while the network bandwidth may well be sufficient for transmitting the multimedia content in a compressed format, it may not be sufficient for transmitting the multimedia content in an uncompressed format (e.g. data in a video interface standard such as DVI).

An example use case may be found in automotive industry front and rear-seat entertainment units, where each independently functioning unit is essential to simultaneously present the same media content, e.g. a DVD video disc inserted into a single device. For economical reasons, it is desirable to make use of an existing network infrastructure, rather than dedicated high-bandwidth equipment, cables, etc., needed for the transmission of audio and video signals to and from each unit, especially when the audio and video signals are provided in a "raw" format.

FIG. 1 demonstrates the basic concept of distributed playback. A number of devices are connected to a network 120. The device which owns or controls the media content being currently played back is the master 110. The media content is represented by a DVD 108 in FIG. 1. All other devices which simultaneously present the same content are slaves 112.

In the field of infotainment and/or entertainment units, especially for the automotive industry, the distribution of a video stream to the various video consumers within the vehicle has seen an increased interest from entertainment unit manufacturers and car manufacturers. Original equipment manufacturers (OEMs) start to ask for a separation between the video source and the video consumer(s) due to requirements for flexibility, network transparency and standardization, while avoiding extensive and proprietary wirings.

The research and development challenges imposed on the suppliers are considerable, as the questions to be solved includes those regarding a guaranteed bandwidth, low latencies, distributed A/V synchronization, block synchronization and compensation of differing travelling times, as well as frame-synchronous presentation on several displays.

A couple of technical requirements and boundary conditions may be taken into account for the architecture of distributed video solutions in vehicles. In FIG. 2, a typical system configuration is represented, comprising of a front console (typically acting as the master element 110) and a rear console (typically acting as the slave element 112). The system configuration further comprises a main amplifier 222 for outputting multi-channel audio and, as the case may be, a digital/analog TV receiver 250 and a rear camera 240. The digital/analog TV receiver 250 is connected to an antenna 252. All components are connected via an automotive suitable high speed ring bus structure 120 (e.g. Media Oriented Systems Transport (MOST), such as MOST150). The front unit 110 comprises a display 212 and user interface elements 214. The rear unit 112 is shown as being connected to two displays 232-1, 232-2 on which the video content may be displayed. Typically, the distance between the rear unit 112 and the displays 232-1, 232-2 is relatively short so that the rear unit 112 may send the uncompressed datastream to the displays via a suitable connection. The rear unit 112 may also be capable of rendering audio data and of providing the rendered audio data to the displays 232-1, 232-2. The displays 232-1, 232-2 may have integrated loudspeakers or, as depicted in FIG. 2, a jack for headphones 234. In the alternative to rendering the audio data via headphones 234, the audio data may be output by means of a loudspeaker 224 connected to the main amplifier 222 which may also be responsible for decoding the audio data.

The design of an infotainment system typically is subject to a number of paradigms such as network transparency, standardized networking, frame-synchronous decoding, and audio/video synchronization and latency.

Network transparency: the overall system, comprising various single components, is intended to offer an integrated infotainment offer. This means that the user shall be enabled to access, from his local console, all media in the system. A DVD in a disc drive of the front unit ("data source") should behave in the same manner as a DVD in the rear unit. This means that the contents of the medium, including all network data such as title information, artist, genre or album are available at each console so that the user can access it and control the playback function, including so-called trick play commands (e.g. fast forward, slow motion, freeze frame, rewind, etc.). Finally, the (decoded) audio and video contents need to be sent to the console of the user ("data consumer"). This property is known as network transparency and presents a core feature of ergonomic multi-access entertainment systems.

Standardized networking: all units of the overall system are mutually connected via a standard bus. Typically, a Media Orientated System Transport (MOST) is used as media bus with a high bandwidth in vehicles. In the alternative, an Ethernet-based network may be used. In contrast to dedicated point-to-point video connections along with their corresponding connection points, protective screenings, driver components and input components, economies in terms of costs and space requirements, as well as an increase in flexibility regarding the application scenarios and the possible installation options may be realized.

Frame-synchronous decoding: even bus systems having a high bandwidth such as MOST150 with 150 Mbit/s, need the transmission of compressed video formats (5 to 50 Mbit/s for high definition formats) rather than uncompressed video formats, as they also transport other signals such as multi-channel PCM audio. This typically requests a consumer-side decoding of e.g. MPEG-2 or MPEG-4 datastreams, while the data medium (DVD, USB device, or SD card) is located in the source. The ring topology of the MOST architecture allows to concurrently supply several consumers with the same signals so that a single data source can be presented in parallel to several consumers. As in the vehicle, in particular from the rear seats, several displays are often visible at the same time, the frame-synchronous decoding and presentation is desired.

Audio/video synchronization and latency: for lip-synchronous video presentation, the synchronization of audio and video streams is needed due to differing audio and video paths and decoder processing times. It has been found that most spectators do not mind audio lagging the video content up to approximately 120 ms. In the opposite case, however, when video lags behind the audio signal—it is typically annoying to the spectator for values between 5 and 10 ms and up. It would also be desirable to be able to synchronize the audio output to the presentation of video content at 2 or more display devices. Especially in connection with video content having frequent changes between brighter scenes and darker scenes, even a small temporal offset between the two or more display devices may be disturbing to the spectators.

SUMMARY

According to an embodiment, a master element for a distributed playback architecture for media data may have a payload data source for providing payload data packets; a beacon packet creator for creating beacon packets useable for synchronizing a playback process of the payload data packets at at least one slave element in the distributed playback architecture; a network interface for transmitting an interleaved packet stream to the at least one slave element, the interleaved packet stream having the payload data packets provided by the payload data source and the beacon packets created by the beacon packet creator; a response packet evaluator for evaluating response packets issued by the at least one slave element in response to the beacon packet by determining a network latency between a first time instant at which a particular beacon packet was transmitted by the master element and a second time instant at which the particular beacon packet was received by the slave element, wherein the response packet evaluator is adapted to measure a total roundtrip time between the first time instant and a third time instant at which a corresponding response packet was received at the master element; and wherein the response packet evaluator is further adapted to determine the network latency on the basis of the measured total roundtrip time; wherein the beacon packet creator is adapted to have the determined network latency for the at least one slave element in a subsequent beacon packet.

According to another embodiment, a slave element for a distributed playback architecture for media data may have a network interface for receiving an interleaved data screen having payload data packets and beacon packets transmitted from a master element of the distributed playback architecture; a beacon packet extractor for extracting the beacon packets from the interleaved datastream; and a beacon packet evaluator for evaluating a transmission time indication within the beacon packet, the transmission time indication being indicative of a first time instant at which a particular beacon packet having the transmission time indication was transmitted by the master element, and for determining a network latency between the master element and the slave element on the basis of the transmission time indication by extracting the network latency indication from the beacon packet indicative of an approximate network latency between the master element and the slave element corresponding to a total roundtrip time of a preceding beacon packet and a corresponding preceding response packet, wherein the beacon packet evaluator is further adapted to adjust a presentation time instant for a payload packet on the basis of the network latency indication; a response packet creator for creating a response packet; wherein the network interface is arranged to transmit the response packet to the master element in response to the particular beacon packet.

According to another embodiment, a distributed playback architecture may have a master element and a slave element, wherein the master element may have a payload data source for providing payload data packets; a beacon packet creator for creating beacon packets useable for synchronizing a playback process of the payload data packets at at least one slave element in the distributed playback architecture; and a network interface for transmitting an interleaved packet stream to the at least one slave element, the interleaved packet stream having the payload data packets provided by the payload data source and the beacon packets created by the beacon packet creator; a response packet evaluator for evaluating response packets issued by the at least one slave element in response to the beacon packet by determining a network latency between a first time instant at which a particular beacon packet was transmitted by the master element and a second time instant at which the particular beacon packet was received by the slave element, wherein the response packet evaluator is adapted to measure a total roundtrip time between the first time instant and a third time instant at which a corresponding response packet was received at the master element; and wherein the response packet evaluator is further adapted to determine the network latency on the basis of the measured total roundtrip time; wherein the beacon packet creator is adapted to have the determined network latency for the at least one slave element in a subsequent beacon packet and the slave element may have a network interface for receiving an interleaved data screen having payload data packets and beacon packets transmitted from a master element of the distributed playback architecture; a beacon packet extractor for extracting the beacon packets from the interleaved datastream; and a beacon packet evaluator for evaluating a transmission time indication within the beacon packet, the transmission time indication being indicative of a first time instant at which a particular beacon packet having the transmission time indication was transmitted by the master element, and for determining a network latency between the master element and the slave element on the basis of the transmission time indication by extracting the network latency indication from the beacon packet indicative of an approximate network latency between the master element and the slave element corresponding to a roundtrip time of a preceding beacon packet and a corresponding preceding response packet, wherein the beacon packet evaluator is further adapted to adjust a presentation time instant for a payload packet on the basis of the network latency indication; a response packet creator for creating a response packet; wherein the network interface is arranged to transmit the response packet to the master element in response to the particular beacon packet.

According to another embodiment, a method for synchronized playback in a distributed playback architecture having a master element and at least one slave element may have the steps of providing a plurality of payload data packets from a payload data source; creating at least one beacon packet useable for synchronizing the synchronized playback of the plurality of payload packets at the at least one slave element;

interleaving the at least one beacon packet with the plurality of payload packets to form an interleaved datastream; transmitting the interleaved datastream over a network to the at least one slave element; receiving the interleaved datastream at the at least one slave element; extracting the at least one beacon packet from the interleaved datastream; sending a response packet from the at least one slave element to the master element in response to the beacon packet; determining, at the master element, a network latency between the master element and the slave element on the basis of the transmission time indication by measuring a total roundtrip time between the first time instant and a third time instant at which the corresponding response packet was received at the master element; having the determined network latency for the at least one slave element in a subsequent beacon packet.

According to another embodiment, a computer readable digital storage medium may have stored thereon a computer program having a program code for performing, when running on a computer, a method for synchronized playback in a distributed playback architecture having a master element and at least one slave element, wherein the method may have the steps of providing a plurality of payload data packets from a payload data source; creating at least one beacon packet useable for synchronizing the synchronized playback of the plurality of payload packets at the at least one slave element; interleaving the at least one beacon packet with the plurality of payload packets to form an interleaved datastream; transmitting the interleaved datastream over a network to the at least one slave element receiving the interleaved datastream at the at least one slave element; extracting the at least one beacon packet from the interleaved datastream; sending a response packet from the at least one slave element to the master element in response to the beacon packet; determining, at the master element, a network latency between the master element and the slave element on the basis of the transmission time indication by measuring a total roundtrip time between the first time instant and a third time instant at which the corresponding response packet was received at the master element; having the determined network latency for the at least one slave element in a subsequent beacon packet.

In an embodiment of a master element for a distributed playback architecture according to the teachings disclosed in this document, the master element comprises a payload data source for providing payload data packets, a beacon packet creator, and a network interface. The beacon pattern packet creator is provided for creating beacon packets usable for synchronizing or playback processing of the payload data packets at, at least, one slave element in the distributed playback architecture. The network interface is provided for transmitting an interleaved packet stream to the at least one slave element, the interleaved packet stream comprising the payload data packets provided by the payload data source and the beacon packets created via the beacon packet creator.

The beacon packets are interleaved with the payload data packets in the interleaved packet stream so that a network which is connected to the network interface, treats the beacon packets substantially in the same manner as the payload data packets. To this end, the beacon packets might be created by the beacon packet creator in a manner that they substantially appear like payload data packets, as far as the network is concerned. For example, the size of the beacon packets could be equal to the size of the payload data packets, or in the same range of the size of the payload data packets in case the payload data packets are variable in size. A difference between the beacon packets and the payload data packets is that the beacon packets do not contain any payload data so that they will not be used for decoding, rendering, and/or presenting the multimedia content. Rather, the beacon packets may comprise information that allows the distributed playback architecture to calibrate itself in terms of synchronicity. In analogy to a real beacon, the beacon packets may be regarded as "flashes" issued by the master element in the direction of the network in order to provide an "orientation" to other elements connected to the network in terms of timing and/or synchronicity. The creation and the transmission of the beacon packets may be based on a regular pattern so that deviations from the regular pattern may be detected by intended receivers of the beacon packets and also the payload data packets.

In another embodiment of the master element according to the teaching disclosed herein, the master element further comprises a response packet evaluator for evaluating response packets issued by the at least one slave element in response to the beacon packets. Evaluating the response packets comprises: determining a network latency between a first time instant at which a particular beacon packet was transmitted by the master element, and a second time instant at which the particular beacon packet was received by the slave element. Knowing the network latency between the master element and the slave element(s) enables the master element to schedule the transmission of the payload data packets in a manner that the payload data packets are (under normal circumstances) available at the slave element(s) by the time they need to be processed, or vice-versa, that is the time at which a particular payload data packet is to be processed is adjusted as a function of the determined network latency.

Adjusting either the time at which payload data packet is transmitted or the time instant at which the payload data packet is processed at the slave element(s), makes it possible to have the content of the particular payload data packet being processed at a predetermined time. This predetermined time can be set to be equal at the master element and/or the slave element(s).

According to an embodiment of the master element, the response packet evaluator may be adapted to extract an arrival time indication from the response packet, the arrival time indication indicating the second time instant at which the particular beacon packet was received by the slave element. The arrival time indication may have been added to the response packet by the slave element according to a local time reference available to the slave element. The time reference available to the slave element may or may not be synchronized to a time reference of the master element.

In a further embodiment according to the teachings disclosed herein, the response packet evaluator may be adapted to measure a total round trip time between the first time instant (at which the particular beacon packet was transmitted by the master element) and a third time instant at which the corresponding response packet was received at the master element. The response packet evaluator may be further adapted to determine the network latency on the basis of the measured total roundtrip time. Under the assumption that the network latency is approximately equal in both directions, an estimate of the network latency can be determined as being half the measured total roundtrip time. In case the network latency is to be estimated in a conservative manner, then the network latency between the master element and the slave element may be determined as being more than 50% of the measured total roundtrip time, by e.g. 55%, 60%, or 70% of the measured total roundtrip time. In this manner, the determination of the (estimated) network latency is independent from an accuracy of a time reference available to the slave element.

In another embodiment of the master element, according to the teachings disclosed herein, the beacon packet creator may be adapted to include the determined network latency for the at least one slave element in a subsequent beacon packet. The slave element is thus informed about the latest network latencies that a particular beacon packet has encountered on its way from the master element to the slave element. Assuming that this latest network latency holds for the subsequent payload data packets, as well, the slave element may take this latest network latency into account when processing the subsequent payload data packets.

In another embodiment, the master element may further comprise a presentation time scheduler adapted to determine an earliest possible presentation instant that is valid for the at least one slave element and a particular payload data packet. The presentation time scheduler may further be adapted to provide the earliest possible presentation instant for inclusion into the particular payload data packet. In case there are several slave elements, the determination of the earliest possible presentation instant may be based on a maximal network latency for the at least one slave element, or for a plurality of slave elements. The earliest possible presentation instant indicates when, given the currently available data, the master element and all affected slave elements will be capable of presenting the payload data content contained in a particular payload data packet. The master element may choose to add a safety margin to the earliest possible presentation instant.

The beacon packet creator may be arranged to create beacon packets at regular time intervals or according to a predetermined schedule.

In an embodiment the response packet evaluator may be further arranged to establish a list indicating the slave elements that have sent response packets during a preceding, predetermined time span. Maintaining a list of responsive slave elements keeps the response packet evaluator and the master element informed about which slave elements are currently receiving and/or using the payload data packets. The slave elements may be configured to send sign-off information to the master element when quitting the processing of the payload data packet.

In an embodiment of the master element according to the teaching described in this document, the list may further indicate a network latency for each one of the plurality of slave elements measured in the list, and wherein the beacon packet creator may be arranged for including the list in a subsequent beacon packet. The slave elements are thus informed about their respective network latencies in a substantially immediate manner, i.e. typically with a delay of one beacon packet cycle.

The master element may further comprise an arbitrator for arbitrating a plurality of playback control commands issued by the at least one slave element. The arbitrator may resolve conflicts that may occur when different playback control commands are issued substantially simultaneously at different slave elements and/or the master element. Arbitration may be based on predefined rules and/or a selected mode of operation. For example, certain slave elements may be excluded from being able to control the distributed playback architecture in certain modes of operation. Hence, the arbitrator may be configured to ignore playback control commands issued by the rear unit of an automotive entertainment system. It may also be possible for the arbitrator to receive certain status information from the vehicle, such as whether the vehicle is moving, in which case the slave element corresponding to the driver's seat may be ignored by the arbitrator for safety reasons. Typically, no video content is displayed in the displays visible to the driver in order to minimize distraction of the driver.

In another aspect of the teachings disclosed in this document, a slave element for a distributed playback architecture for media data is proposed. The slave element comprises a network interface for receiving an interleaved datastream comprising payload data packets and beacon packets transmitted from a master element of the distributed playback architecture; a beacon packet extractor for extracting the beacon packets from the interleaved datastream; and a beacon packet evaluator for evaluating a transmission time indication within the beacon packet, the transmission time indication being indicative of a first time instant at which a particular beacon packet comprising the transmission time indication was transmitted by the master element, and for determining a network latency between the master element and the slave element on the basis of the transmission time indication.

The slave element may use the knowledge about the network latency as a piece of information useful for synchronizing the slave element to the master element, in particular, with respect to a playback action occurring at the slave element, on other slave elements, and/or the master element. The determination of the network latency might be interpreted as estimating the network latency with an accuracy sufficient for the purposes of the distributed playback architecture. Furthermore, the term "determining" may be understood, in some embodiments, as extracting a network latency value from the beacon packet, the latency value having been written to the beacon packet by the master element. In an alternative embodiment, the network latency may be determined by the slave element itself.

In an embodiment of the slave element according to the teachings disclosed herein, the slave element may further comprise a response packet creator for creating a response packet. The response packet may comprise at least one of a network latency indication and an arrival time indication, the arrival time indication indicating a second time instant at which the particular beacon packet was received by the slave element. The network interface may be arranged to transmit the response packet to the master element in response to the particular beacon packet. By means of the response packet, additional information is exchanged between the slave elements that may be useful for synchronization purposes. The exchange of information may be used to determine or at least estimate for example a time instant at which a certain slave element should display a certain frame (image) in order to be in synchronicity with the master element and/or other slave elements. Note that depending on whether the slave element has access to a common reference clock or not, the time instant needs to be determined in the clock system used by the slave element. The slave element clock may, as the case may be, exhibit an offset with respect to the master element clock.

In embodiments, the beacon packet evaluator may further be adapted to extract a network latency indication from the beacon packet indicative of an approximate network latency between the master element and the slave element. The beacon packet evaluator may also be adapted to adjust a presentation time instant for a payload packet on the basis of the network latency indication.

In further embodiments according to the teachings disclosed herein, the slave element may further comprise a packet requester arranged to transmit a request to the master element causing the master element to transmit at least one packet identified by the request. This may be useful when the slave element has recently joined the distributed playback architecture to be included in a distributed playback action, or if one or more packets were lost and there is still enough time until the scheduled presentation time instant(s).

The slave element may further comprise a packet loss detector arranged to detect a missing payload packet in the interleaved datastream. The packet loss detector may cooperate with the packet requester so that lost packets may be resent by the master element. Packet loss may, to a certain extent, thus be recoverable without affecting the presentation of the media data.

In embodiments according to the teachings disclosed in this document, the slave element may further comprise a user interface for receiving user input regarding playback control, wherein the network interface is arranged to transmit the user input to the master element. The slave element may thus be used to control the playback action for the entire distributed playback architecture which adds to the network transparency.

Another aspect of the teachings disclosed in this document relates to a distributed playback architecture comprising a master element and a slave element, as described above. In the distributed playback architecture the master element and the slave element(s) interact in order to achieve a high degree of synchronicity. The beacon packets and optionally the response packets may be used to evaluate the network between the master element and the slave element(s), and to gauge the distributed playback architecture.

Yet another aspect of the teachings disclosed herein relates to a method for synchronized playback in a distributed playback architecture comprising a master element and at least one slave element. At the master element side, the method comprises: providing a plurality of payload data packets from a payload data source; creating at least one beacon packet useable for synchronizing the synchronized playback of the plurality of payload packets at the at least one slave element; interleaving the at least one beacon packet with the plurality of payload packets to form an interleaved datastream; and transmitting the interleaved datastream over a network to the at least one slave element.

At the slave element's side, the method comprises: receiving the interleaved datastream at the at least one slave element; extracting the at least one beacon packet from the interleaved datastream; evaluating the at least one beacon packet and a transmission time indication provided by the at least one beacon packet, the transmission time indication being indicative of a first time instant at which a particular beacon packet was transmitted by the master element; and determining a network latency between the master element and the slave element on the basis of the transmission time indication.

Note that the method relative to the slave element could be performed and claimed independently from the method of the master element.

According to an aspect of the teachings disclosed herein, a computer-readable digital storage medium may have stored thereon a computer program code for performing, when running on a computer, a method for synchronized playback in a distributed playback architecture comprising a master element and at least one slave element, the method comprising: providing a plurality of payload data packets from a payload data source; creating at least one beacon packet useable for synchronizing the synchronized playback of the plurality of payload packets at the at least one slave element; interleaving the at least one beacon packet with the plurality of payload packets to form an interleaved datastream; and transmitting the interleaved datastream over a network to the at least one slave element.

BRIEF DESCRIPTION OF THE DRAWINGS

Embodiments of the invention will be described referring to the accompanying drawings, in which.

DETAILED DESCRIPTION OF THE INVENTION

Figure 1:
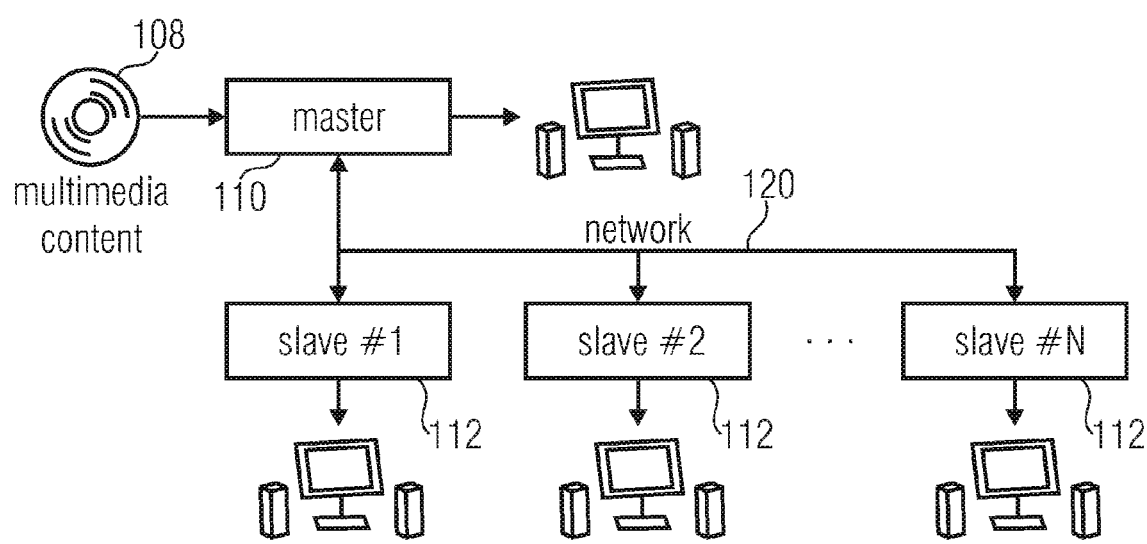
FIG. 1 shows a schematic block diagram demonstrating the basic concept of distributed playback.
Figure 2:
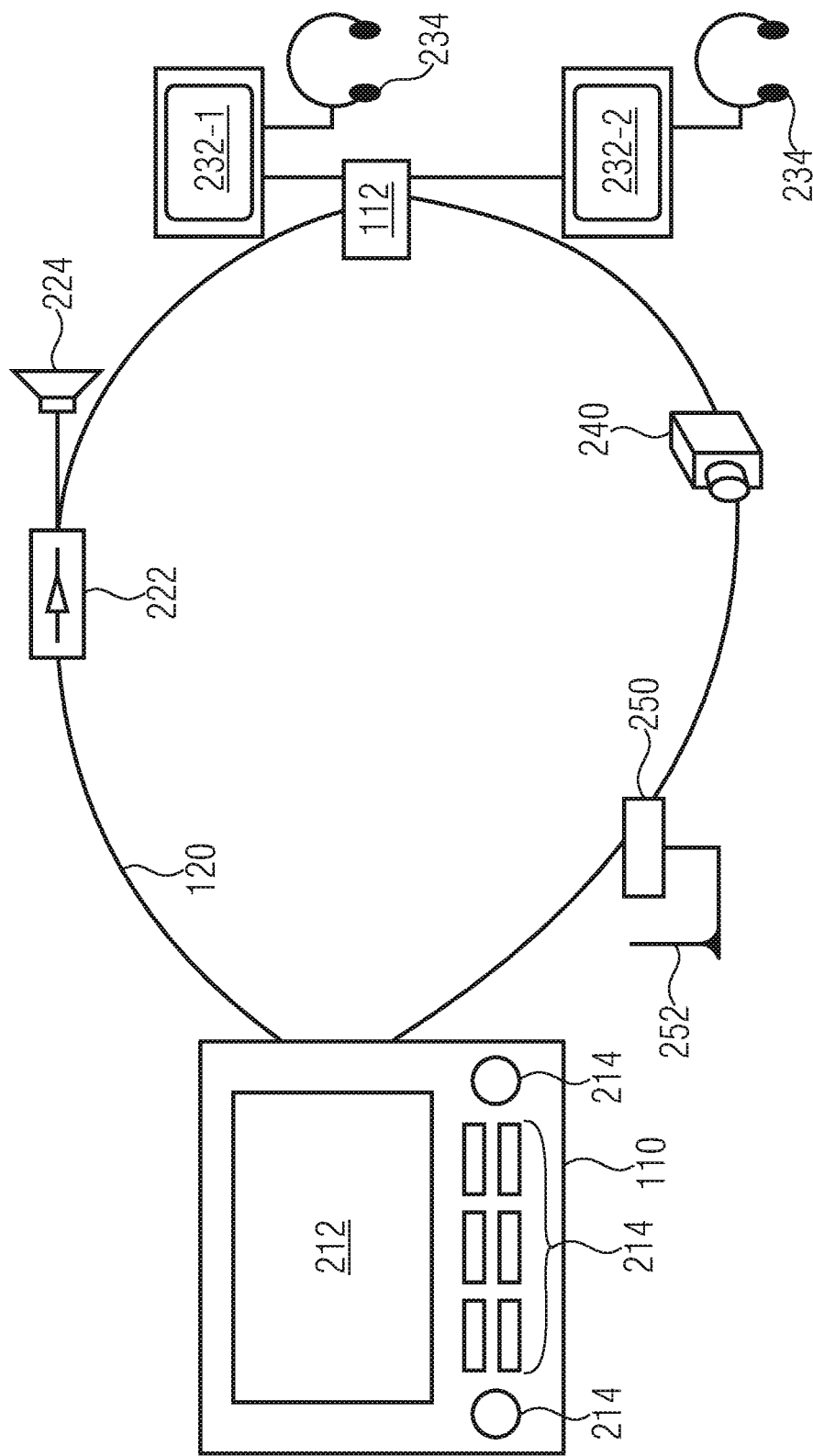
FIG. 2 shows a schematic, typical configuration of a distributed entertainment system.

FIGS. 1 and 2, which have already been described above, show a schematic block diagram of a distributed playback architecture and a typical configuration of a distributed entertainment system as it may be found in automobiles.

Figure 3:
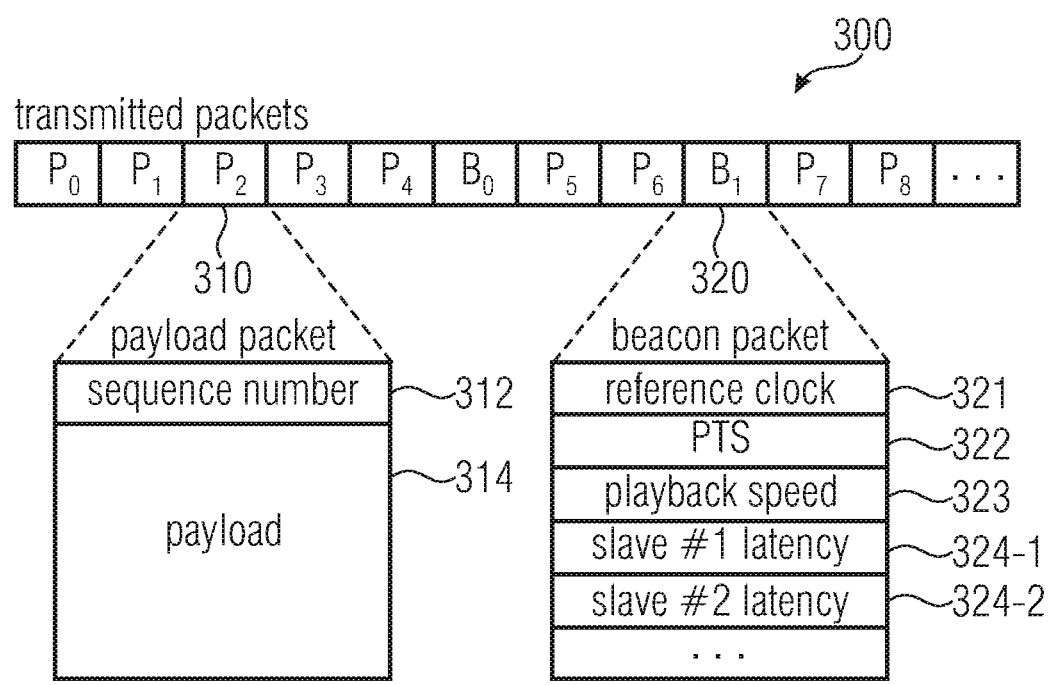
FIG. 3 shows a schematic diagram of a datastream and details of payload packets and beacon packets.

FIG. 3 shows a schematic datastream 300, the main function of which is to transmit information from a media source or media origin to a media consumer connected to each other via a network, a bus system, or the like. The datastream 300 comprises a plurality of payload packets $P_0$ to $P_8$. In FIG. 3, the datastream or packet stream 300 is represented with no pauses between the packets, i.e. a subsequent packet immediately follows a preceding packet. In the alternative, the datastream 300 could present a sporadic transmission pattern, that is, there may be a temporal gap between the preceding packet and the subsequent packet.

In the context of a distributed playback architecture for media data, the media data is transmitted within the datastream 300 as payload packets $P_0$ to $P_8$. FIG. 3 shows an example of the inner structure of a particular payload packet 310. The payload packet 310 comprises a data field for a sequence number 312 and another data field for the actual payload 314. The sequence number 312 typically allows a media data consumer to sort arriving payload packets 310 into the correct order. Payload packets are uniquely identified by the payload sequence number 312, incremented for each original payload packet transmitted. The sequence number 312 enables a slave to detect lost packets, or to re-order packets if network conditions are such that packets are received out of sequence. Payload packets may be transmitted by the master more than once, e.g. on slave initial connections, or if the master is requested to re-transmit lost packets. In this case, duplicate packets are re-transmitted with their original sequence numbers, and can be ignored by slaves which have already received them.

The number of bits needed to encode the payload sequence number is implementation specific and not defined here. It may be needed to encode additional information into the high-order bits of the payload sequence number, indicating for example, if the payload is continuous. When a slave detects a discontinuity, e.g. if the master begins playback of a new payload, or after a seek operation, it may flush any previously buffered payload and start presentation from the current packet. This function would not normally be expected to be invoked by the playback control commands, but the above approach provides an additional layer of robustness, since packets containing further commands may be lost.

A payload packet may contain one or more presentation time stamp (PTS) values indicating the presentation time at which streams contained within the payload packet are to be presented. Typically, a slave cannot present audio or video until it receives at least one PTS for each stream which it should present, so a master should ensure that PTS values are assigned with reasonable frequency. During decoding and presentation of a stream, if the PTS is not indicated, it is assumed to be continuous with the PTS of the previous decoded stream contents, as determined by the video frame rate or audio sampling rate.

Besides the payload packets $P_0$ to $P_8$, the datastream 300 also comprises beacon packets $B_0$ and $B_1$ which are also identified by reference sign 320. The beacon packets 320 are typically transmitted at regular intervals and they may be expected to be acknowledged by each slave. The continuous process of transmission and acknowledgement allows the master to determine, at any point in time, the unique identifier of each slave on the network, and the approximate network latency of each slave. In an exemplarily implementation, the beacon packets 320 may contain at least the following information:

reference clock time 321,
current presentation time on the master 322,
current playback speed 323, and
list of latencies of each slave known to the master 324-1, 324-2.

The reference clock time as contained in the corresponding reference clock time field 321 is the time on the master's clock at the time that the packet was transmitted. This clock may be any high resolution timer on the master device. The time recorded in the beacon packet 320 may be returned to the master as part of a slave acknowledgement, by which means the network latency of the slave may be determined. In a simple implementation, the network latency may be roughly approximated as half of the difference in time between transmitting the beacon packet and receiving the slave acknowledgement.

The presentation time as contained in the PTS field 322 is the presentation time on the master at the time that the packet is transmitted. The presentation time runs independently from the reference time, since it is modified by the current playback speed. As mentioned above, the presentation time is usually delayed with respect to the PTS values in the interleaved payload, since the payload is transmitted ahead of time.

The playback speed (playback speed field 323 of the beacon packet 320) is the playback speed on the master at the time that the packet is transmitted. The playback speed is the rate at which presentation time advances, relative to the reference clock.

The exemplary beacon packet 320 shown in FIG. 3 additionally contains a list of all slaves known to the master. The contents of this list will change over time as slaves appear and disappear on the network. Each entry in the list may contain the slave's unique identifier, determined by the slave's acknowledgement to a previously transmitted beacon packet and the calculated network latency of that slave.

A slave, on detecting its own identifier and latency in the list, may adjust its own presentation time, equal to the master's presentation time plus the latency multiplied by the playback speed. This means that a slave's presentation clock is synchronized to the master presentation time plus the latency multiplied by the playback speed. This means, a slave's presentation clock is synchronized to the master.

Figure 4:
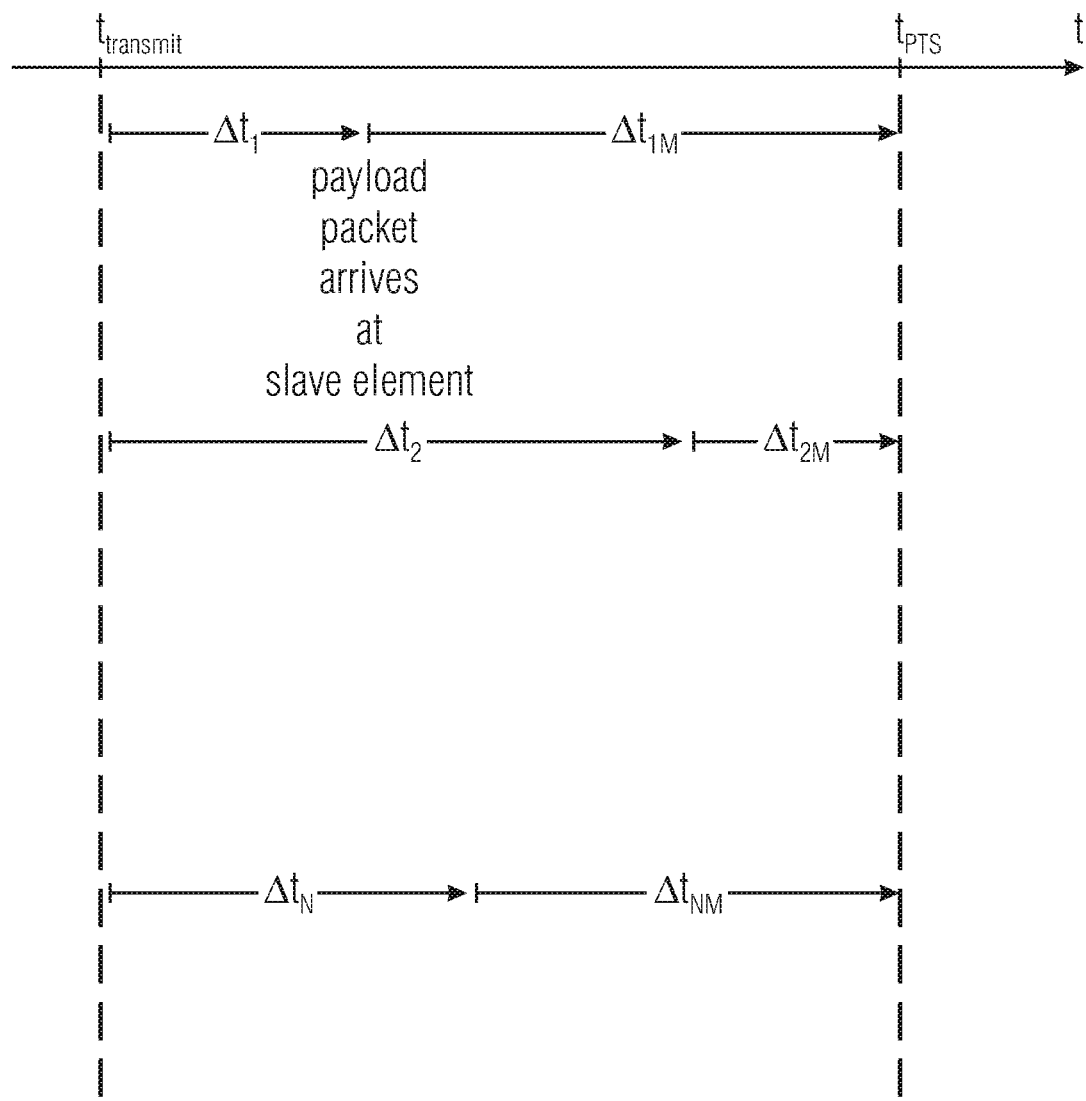
FIG. 4 is a timing diagram useful for understanding the concept of distributed playback.

FIG. 4 shows a time diagram in which a number of time instants and time spans are illustrated. The time t corresponds to the time as measured by the master's clock. The master element transmits a payload packet in the direction of one or several slave elements connected to the master element via a network or a bus system. The transmission occurs at a time instant $t_{transmit}$. Depending on a network topology and/or a distance between the master element and the various slave elements, the payload packet needs a certain time span for reaching a particular slave element. These time spans are indicated in FIG. 4 by the quantities $\Delta t_1$ and $\Delta t_2$ and $\Delta t_N$ for a first slave element, a second slave element, and a N-th slave element, respectively. Thus, the payload packet arrives at the first slave element $\Delta t_1$ after the transmission of the payload data packet from the master element at $t_{transmit}$. A schedule presentation time $t_{PTS}$ is also illustrated in FIG. 4. The scheduled presentation time is typically set by the master element and submitted to the slave elements as a part of the regularly sent beacon packets. Note that the presentation time stamp might not be sent for each and every payload packet, but rather the slave element uses a previously communicated presentation time stamp and the current playback speed to extrapolate or otherwise determine the presentation time stamp for a payload packet recently received at the slave element. At each slave element, a time margin $\Delta t_{1M}$ and $\Delta t_{2N}$, or $\Delta t_{NM}$ typically exists between the reception time instants and the scheduled presentation time $t_{PTS}$, so that the slave elements have enough time to process the payload packet and prepare it for playback, i.e. display or presentation. Even when the time span needed for transmission from the master element to the slave element is relatively long as it is exemplarily illustrated for slave element 2 and the corresponding time span $\Delta t_2$, the remaining time margin $\Delta t_{2M}$ is typically chosen sufficiently long for any needed processing of the payload data packet at the slave element to be performed during the time margin. This may involve moving the scheduled presentation time instant towards later time instants, which is typically controlled by the master element in a global manner, affecting the master element and all slave elements that are currently involved in the distributed playback period.

Figure 5:
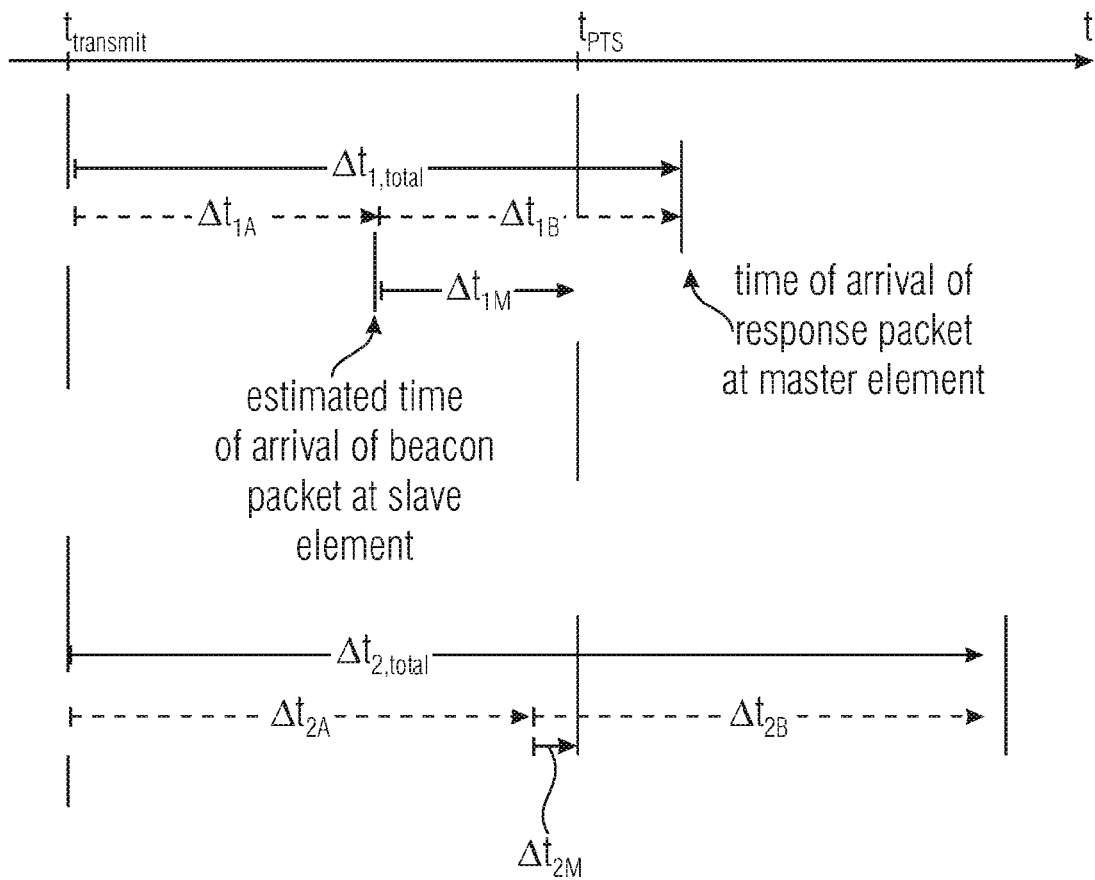
FIG. 5 is another timing diagram useful for understanding the concept of distributed playback.

FIG. 5 shows another time diagram that illustrates a possible implementation of how the scheduled presentation time $t_{PTS}$ may be determined by the master element. Assuming that the master element has sent a beacon packet to the one or more slave elements and the slave elements have responded to the beacon packets with a response packet, the master element may determine the roundtrip time of the beacon packet and the corresponding response packet. The roundtrip time is the time span between the instant at which the beacon packet has been transmitted by the master element $t_{transmit}$, and the instant at which the response packet arrives at the master element. The total roundtrip times are indicated as $\Delta t_{1,\ total}$ for a slave element number 1 and $\Delta t_{2,\ total}$ for a slave element number 2. These time spans can be measured by the master element by storing the transmit time $t_{transmit}$ and the various times of arrival of the response packets at the master element. Assuming that the total roundtrip time for one slave element is approximately equally distributed among the transmission of the beacon packet from the master element to the slave element and the transmission of the corresponding response packet from the slave element back to the master element, the time at which the beacon packet has arrived at the slave element can be estimated as the transmit time $t_{transmit}$ plus 50% of the total roundtrip time $\Delta t_{1, total}$. In FIG. 5, the transmit durations of the various lengths of transmission from the master element to the slave elements and vice-versa are represented by the following reference signs: $\Delta t_{1A}$, $\Delta t_{1B}$, $\Delta t_{2A}$, and $\Delta t_{2B}$. Based on these determinations, the master element may find out that the transmission of the beacon packet to slave element number 2 needed the longest time among all of the slave elements that have sent corresponding response packets (FIG. 5 only covers the case with two slave elements for the sake of ease of illustration, but may easily be extended to a larger number of slave elements). Once the maximum transmission times for a given beacon packet has been determined by the master element, the scheduled presentation time may be adjusted by the master element as a function thereof. Thus, the remaining time margin $\Delta t_{2M}$ is typically a minimum allowable time margin needed by the slave elements to process incoming payload packets in order to present the media content of these payload packets in time at the scheduled presentation time $t_{PTS}$. In order to be on the safe side, the estimated time of arrival of the beacon packet at a particular slave element may be estimated to be at e.g. 60%, 70%, or even 100% of the total roundtrip time $\Delta t_{1, total}$, $\Delta t_{2, total}$.

Depending on the particular implementation and the embodiment of the teachings disclosed in this document, beacon packets should be acknowledged by the slave elements (preferably: by each slave element) as soon as they are received. This acknowledgement consists of some form of packet transmitted by the slave element to the master element. The exact form may depend upon network protocol and other design limitations, but may typically contain at least the following information:

The slave unique identifier. This is to be constant from one packet to another, and guaranteed unique among all slaves on the network. Depending on implementation, the identifier may be built into the network protocol itself, e.g. the IP address of the slave.

A copy of the master's reference clock time recorded in the beacon packet to which this packet is an acknowledgement. The enables the master to determine the network latency of the slave.

To save transmission overhead, it may be useful to combine beacon acknowledgements with other types of information, e.g. a request for re-transmission of lost packets. The response packets mentioned above may be used as an acknowledgement of the reception of a beacon packet.

Figure 6:
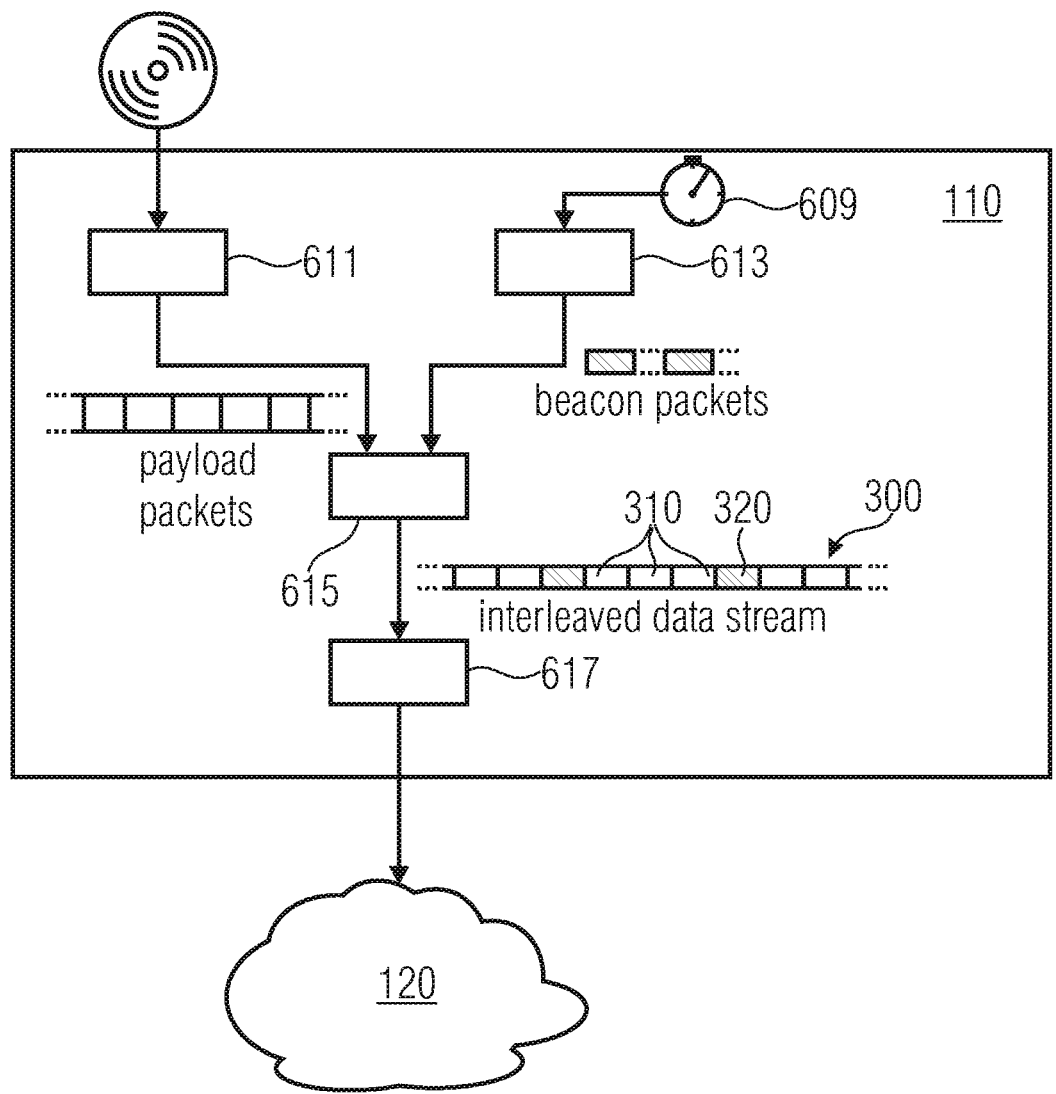
FIGS. 6 to 8 show schematic block diagrams of different implementations of a master element in a distributed playback architecture.

FIG. 6 shows a schematic block diagram of a master element 110. The master element 110 is capable of reading a storage medium such as a DVD and/or a blue-ray disc. The master element 110 comprises a payload data source 611 to read the data from the storage medium and to perform typical data processing operations for data provided from a storage medium, for example decrypting the data provided by the storage medium. The payload data source 611 outputs payload data, typically in the form of payload packets. The master element 110 also comprises a beacon packet creator 613 for creating beacon packets that may be used for synchronizing a distributed playback of the payload data contained in the payload packets. The beacon packet creator 613 is connected to a reference clock 609 of the master element 110 and receives a reference clock signal therefrom. The reference clock signal enables the beacon packet creator 613 to insert a current time value into the beacon packets so that a time of creation of a particular beacon packet is stored in the same beacon packet.

The payload packets and the beacon packets are transmitted to the packet merger or packet merging unit 615 which is arranged to create the interleaved datastream 300 in which the beacon packets 320 are interleaved with the payload packets 310. Typically, a new beacon packet 320 is provided every N payload packets 310. The interleaved datastream 300 is sent from the packet merging unit 615 to a network interface 617 which provides a connection from the master element 110 to a network 120. The interleaved datastream 300 is distributed within the network 120 to at least one slave element (not depicted).

In principle, it is possible that the network 120 splits the datastream into its constituting packets, i.e. payload packets 310 and beacon packets 320, while the packets are traveling across the network so that each packet may be transported within the network 120 in a substantially independent manner from the other packets. Thus, the routes through the network 120, along which different packets travel from the master element 110 to a particular slave element, may vary from one packet to a subsequent packet. The same may be true for the time needed by a packet to travel from the master element 110 through the network 120 to a particular slave element. Nevertheless, it can often be assumed that the conditions for different packets travelling through the network 120 from the master element 110 to a particular slave element are substantially constant during a given time interval. This assumption may typically be made as long as the network conditions remain substantially unmodified and/or the network 120 is not operated close to its maximal capacity, that is, the network still has sufficient capacity margin. The assumption that packets within the interleaved datastream 300 that are transmitted by the master element 110 during a time interval which is not too long, experience similar travelling conditions within the network 120 also applies to the payload packets 310 and the beacon packets 320. In particular, the beacon packets can be created by the beacon packet creator 613 in such a manner that they are substantially similar to the payload packets 310, as far as the network 120 is concerned.

Figure 7:
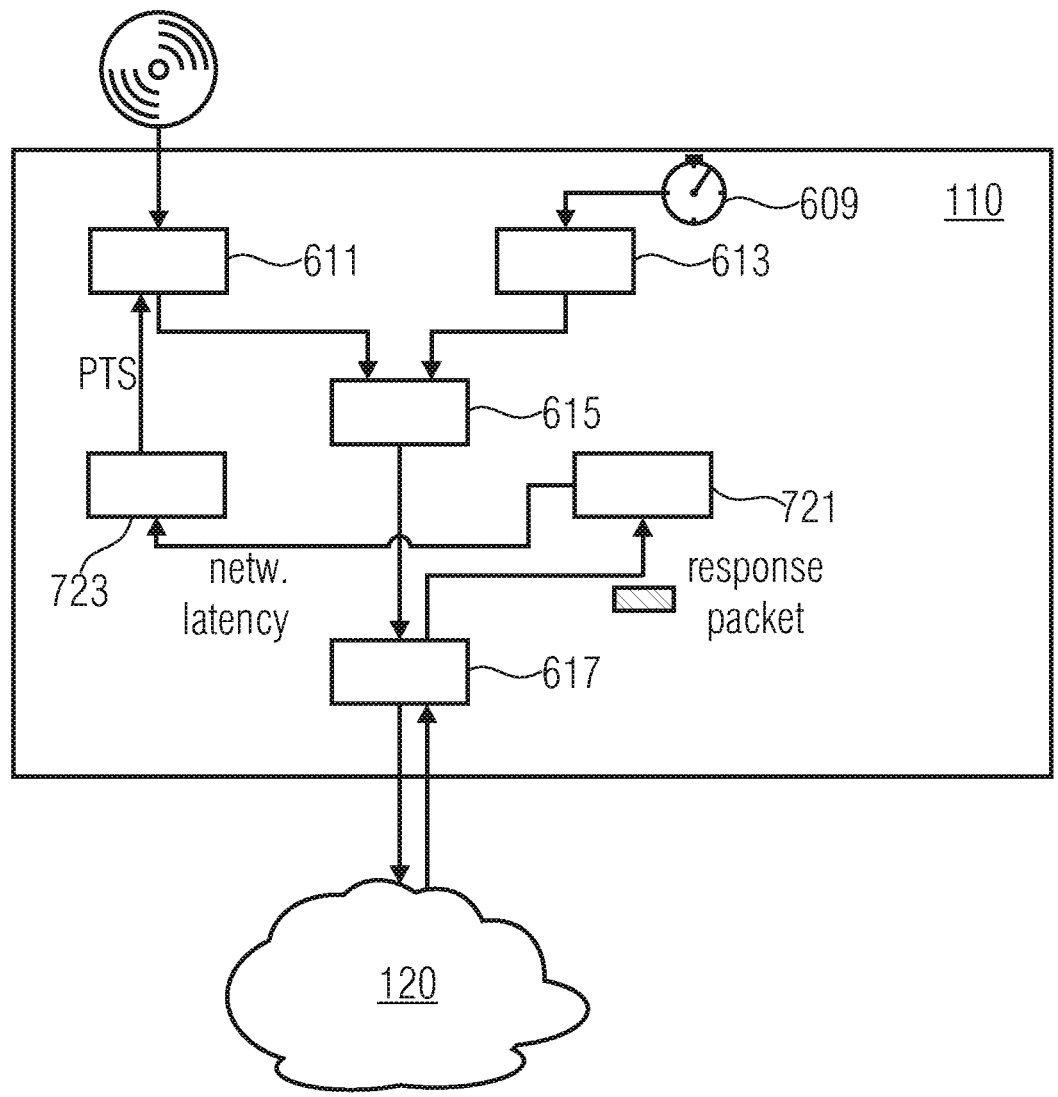

FIG. 7 shows a schematic block diagram of another possible implementation of the master element 110. The difference between the implementation shown in FIG. 6 and this schematic diagram is that the master element 110 further comprises components that are adapted to receive and evaluate a feedback from the slave elements with respect to the beacon packets 320. The network interface 617 receives a response packet from the network 120 that originated at a particular slave element. The network interface 617 forwards the response packet to a response packet evaluator 721. The response packet evaluator 721 typically extracts information from the response packet and may compare data contained in the response packet with data that belongs to a corresponding beacon packet 320. The response packet may be linked to the corresponding beacon packet in that a slave element created and transmitted the response packet to the master element 110 upon receipt of the corresponding beacon packet 320. The information about the corresponding beacon packet may even be included in the response packet so that the response packet evaluator 721 may simply extract the information from the response packet for subsequent analysis. In the exemplary implementation shown in FIG. 7, the response packet evaluator 721 is arranged to determine a current value of a network latency between a master element 110 and the slave element from which the response packet was received. The network latency value is transmitted to a presentation time scheduler 723 that creates a presentation time stamp (PTS). The presentation time stamp is provided to the payload data source 611 which uses it to insert the presentation time stamp in the payload packet 310. For certain types of media data, such as music and movie pictures, the presentation time stamp is governed by relatively strict conditions imposed by the playback speed. In order for the media content to be presented at an intended, steady rate to the viewer or listener, the presentation time stamp needs to be increased in a regular manner. It is, however, possible to slightly modify the rate at which the presentation time stamps are increased without the viewer or the listener noticing such a variation. It is therefore possible to slow the presentation of the media content down slightly in case a degradation of the network latency (i.e. the network latency becoming bigger) is detected by the response packet evaluator 721.

Figure 8:
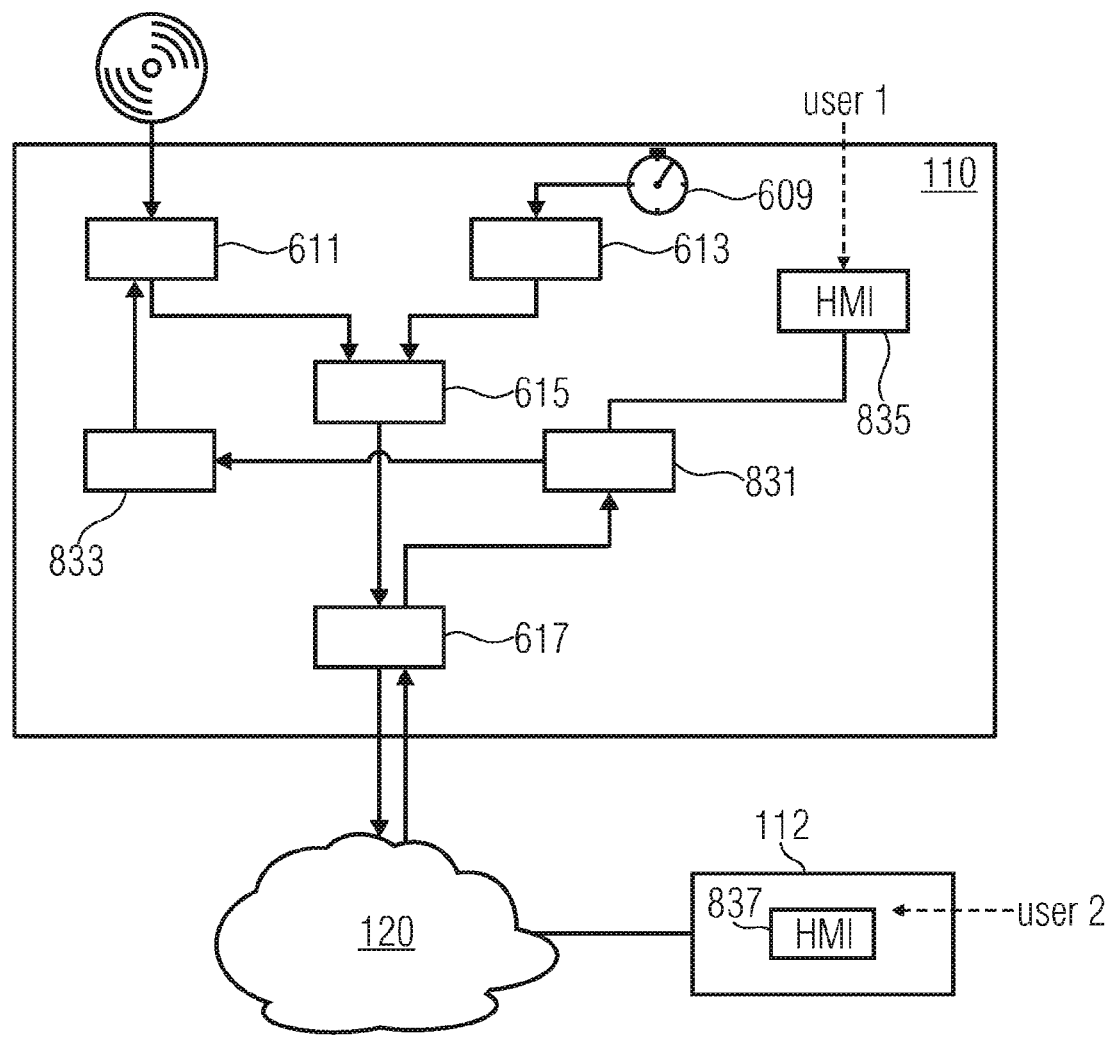

FIG. 8 shows a schematic block diagram of yet another possible implementation of the master element 110. The payload data source 611, the beacon packet creators 613, the reference clock 609, and the packet merging unit 615 are substantially as described with respect to FIG. 6. The master element 110 now further comprises a human machine interface 835. A first user may use the human machine interface 835 to enter commands regarding the playback conditions to the master element 110. In a similar manner, a slave element 112 comprises another human machine interface 837 which may be used by a second user to enter his/her commands regarding the playback conditions of the media data. The slave element 112 transmits the command entered by the second user to the master element 110 via the network 120. In the alternative to the network 120, another means of communication may be used for transmitting the commands from the slave element 112 to the master element 110. The command transmitted by the slave element 112 is received at the network interface 617 and provided to an arbitrator 831. Also, the command entered by the first user via the human machine interface 835 of the master element 110 is provided to the arbitrator 831. If the first user and the second user have issued different commands in a substantially simultaneous manner, it is not per se clear which of the commands should be considered for controlling the distributed playback architecture. The arbitrator 831 implements rules to resolve such a conflict. For example, one of these rules may be that the first user, who has entered his/her command at the human machine interface 835 of the master element 110, has a precedence over the second user at the slave element 112. In this case, the arbitrator 831 would thus choose the command entered by the first user and send it to a playback controller 833. The playback controller 833 translates the user command to one or more control signals intended for various components of the distributed playback architecture. As an example, the playback controller 833 provides a control signal to the payload data source 611. The control signal could cause the payload data source 611 to seek a new position on the DVD and/or the Blu-ray disc. A central arbitration of user commands may be desirable in order to prevent that the master element 110 and one or more slave elements 112 start to operate according to different playback modes. Such a confusion about the currently valid playback mode could be undesired if, for example, the video stream of a movie picture is distributed to the slave elements 112 and also displayed at the master element 110, while the audio stream of the same movie picture is output via a central amplifier and loudspeaker system for all users.

Figure 9:
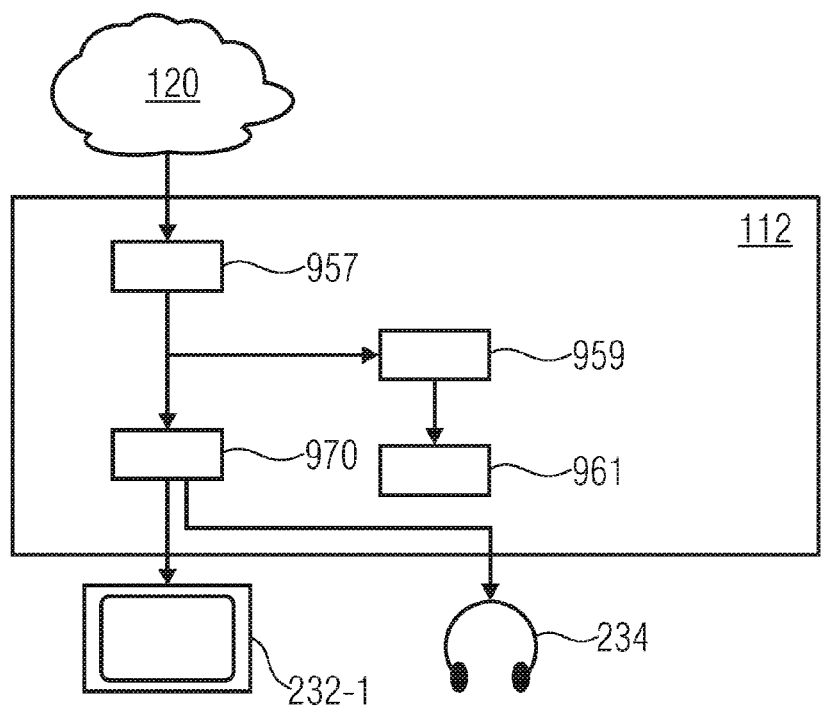
FIGS. 9 to 11B show schematic block diagrams of different implementations of a slave element in a distributed playback architecture.

FIG. 9 shows a schematic block diagram of a slave element connected to the network 120. The slave element 112 comprises a network interface 957, a payload data processor 970, a beacon packet extractor 959, and a beacon packet evaluator 961. The network interface 957 receives the interleaved datastream 300 from the network 120, and provides it to the payload data processor 970. Typically, the payload data processor 970 considers the payload packets 310 that are contained in the interleaved data stream 300. As to the beacon packets 320, the payload data processor 970 typically ignores them. The beacon packets 320 are, however, extracted from the interleaved datastream 300 by the beacon packet extractor 959 that transmits the extracted beacon packets 320 to the beacon packet evaluator 961. The beacon packet evaluator 961 may analyze the beacon packet with respect to the time at which the beacon packet was transmitted by the master element 10. This beacon packet transmission time may be contained in the beacon packet in a corresponding data field. From the beacon packet transmission time and a time at which the beacon packet was received at the network interface 957 of the slave element 112, the beacon packet evaluator 961 may, for example, determine a network latency. The network latency may then be taken into account when scheduling the media content contained in the payload packets for presentation on the display 232-1 and/or the headphones 234.

Figure 10:
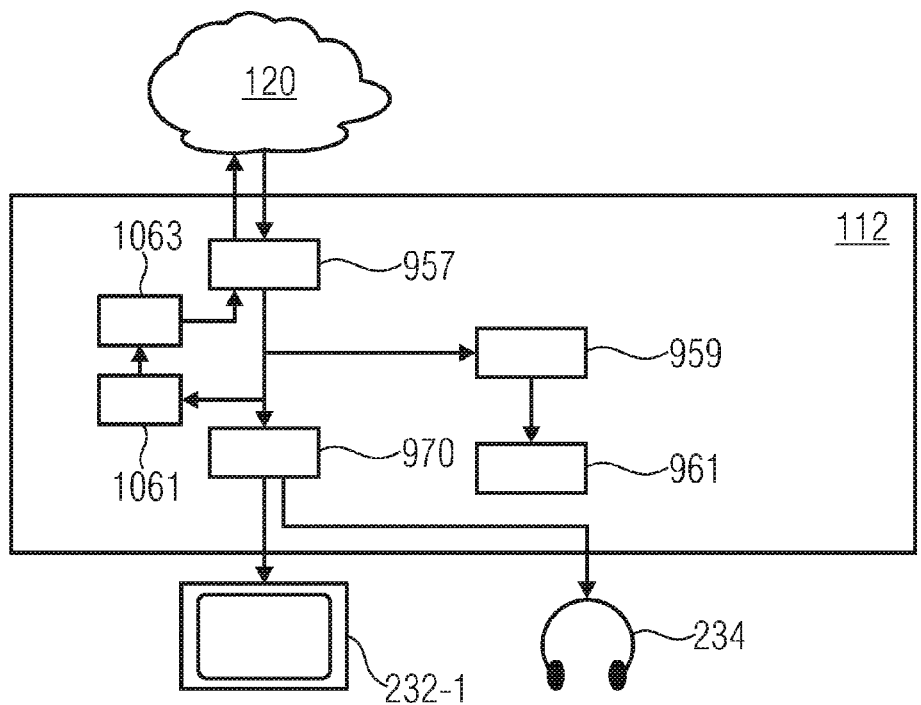

FIG. 10 shows a schematic block diagram of another implementation of the slave element 112. In addition to the components illustrated in FIG. 9, the slave element 112, shown in FIG. 10, further comprises a packet loss detector 1061 and a packet requester 1063. The packet loss detector 1061 supervises the datastream provided by the network interface 957 to find out whether there is a gap in the sequence numbers of the payload packets 310. Upon detection of a gap, the packet loss detector 1061 gathers information on the packet that presumably has been lost on its way from the master element 110 to the slave element 112, such as the expected sequence number. This information may then be forwarded from the packet loss detector 1061 to the packet requester 1063 which creates a corresponding request to be sent to the master element via the network interface 957 and the network 120.

Figure 11A:
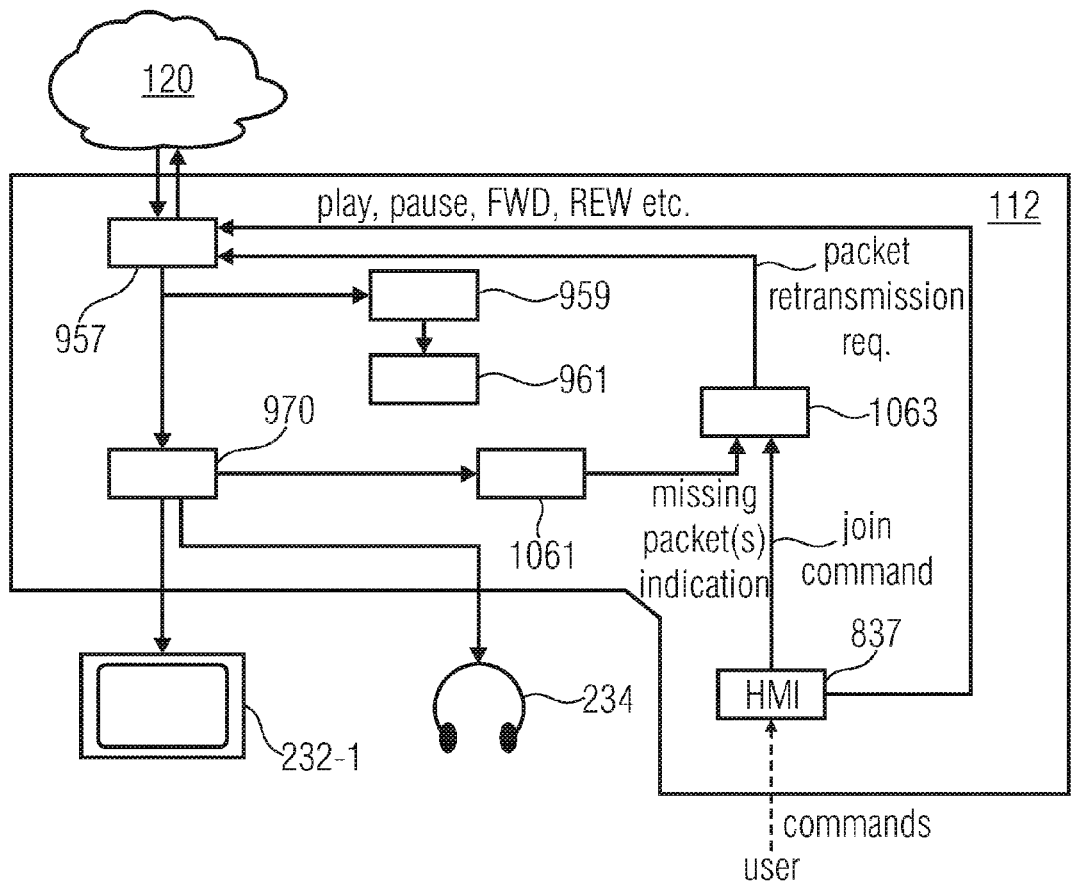
Figure 11B:
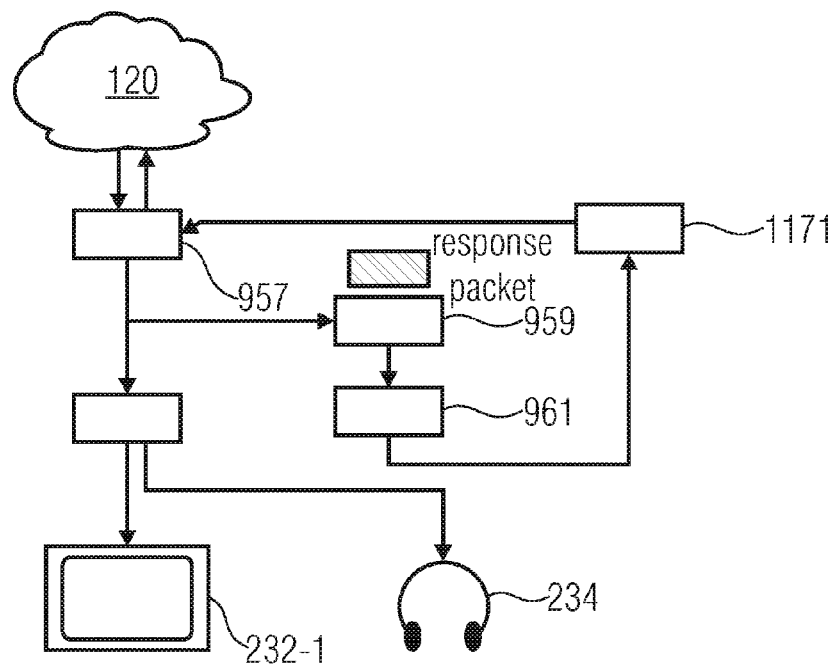

FIG. 11 shows a schematic block diagram of another possible implementation of the slave element 112. The network interface 957, the beacon packet extractor 959, the beacon packet evaluator 961, and the payload data processor 970 are already known from FIG. 9. Furthermore, the packet loss detector 1061 and the packet requester 1063 are known from the implementation of the slave element 112 illustrated in FIG. 10. The implementation shown in FIG. 11 further comprises the human machine interface 837 via which a user may enter commands regarding the playback mode into the slave element 112. Typically, the command entered by the user are intended to be distributed across the distributed playback architecture so that the same media content is presented at the master element 110 and the slave elements 112 that are involved in the playback action. A notable exception is the JOIN command, by which a user at a particular slave element 112 indicates that he/she would like to join in an ongoing playback process. The human machine interface 837 forwards the JOIN command to the packet requester 1063. The packet requester 1063 typically creates a request to the destination of the master element 110 in which a re-transmission of a certain number of previous payload packets 310 is requested. Depending on the format that has been used to encode the media content, it may be particularly helpful for the slave element 112 to receive the latest so-called I-frame from the master element 110, as well as any subsequent P-frames, which enables the slave element 112 to quickly present the current media content. An I-frame is an 'Intra-coded picture', in effect a fully-specified picture, like a conventional static image file. P-frames, on the other hand, hold only part of the image information, so they need less space to store than an I-frame, and thus improve video compression rates. The packet requester 1063 sends the packet retransmission request to the network interface 957 from where it is sent to the master element 110 via the network 120. Furthermore, the human machine interface 837 is also connected to the network interface 957 and capable of sending typical commands to the master element 110, such as play, pause, forward, rewind, etc.

Figure 12:
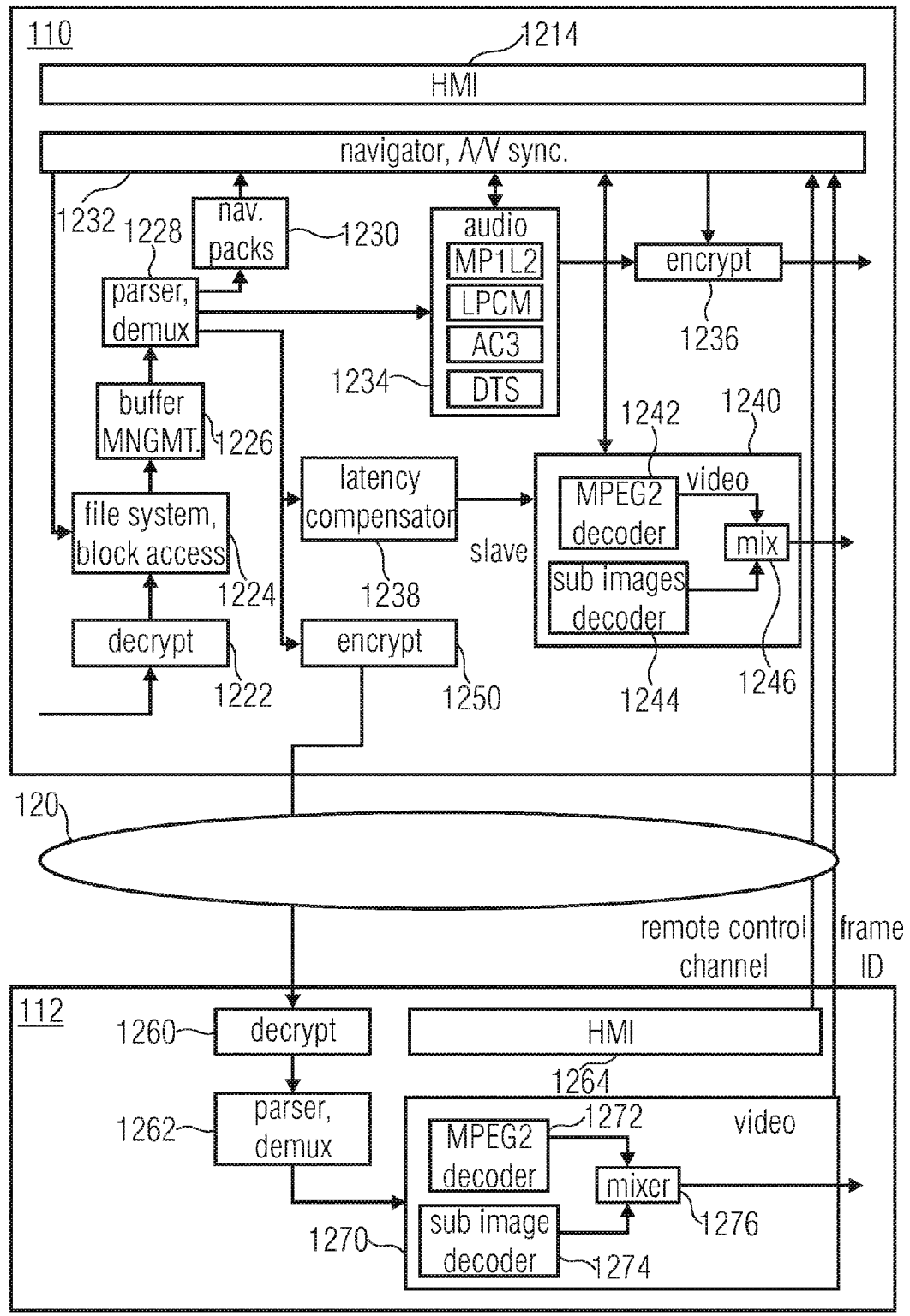
FIG. 12 shows a schematic block diagram of functional components of a master/slave video player.

FIG. 12 shows a schematic block diagram of some components of the master/slave video player. The master/slave video player shown in FIG. 12 is based on a standard DVD player. A standard DVD player typically comprises the functional groups "data input/output", "control and navigation", "audio decoding", and "video processing". Grouping the components into several functional groups serves the purposes of a structured illustration and explanation of the schematic block diagram in order to facilitate its comprehension.

The functional group "data input/output" comprises the components for accessing the data of the DVD (represented by the arrow from the left and leading to the decryption block 1222), CSS-based decryption 1222 of this data, as well as a suitable buffer management 1226. A file system component 1224 is provided between the decryption 1222 and the buffer management 1226. The file system component 1224 can be used to control a block access on the DVD or another storage medium. Furthermore, the functional group "data input/output" comprises a latency compensator 1238 and an encryptor 1250. Within the slave element, the functional group "data input/output" further comprises a decryptor 1260.

The output of the buffer management 1226 is provided to a parser and demultiplexer 1228 which is a part of the functional group "control". The parser and demultiplexer 1228 examines the data received from the buffer management 1226 and classifies it into different data categories. In the embodiment shown in FIG. 12, these data categories are navigational data, audio data, and video data. The navigational data is sent from the parser/demultiplexer 1228 to a so-called NavPack handler 1230. In the case of a DVD, a NavPack typically contains a system header and two fixed length packets called presentation control information (PCI), and data search information (DSI). The navigation pack handler 1230 extracts data to be used for navigation purposes from the NavPacks and provides them to a navigator block 1232. The navigation pack handler 1230 and the navigator block 1232 belong to the function group "control". The navigator 1232 typically entertains a communication with a human machine interface 1214 (which may be identical to the human machine interface 835 shown in FIG. 8). The human machine interface 1214 typically presents informational content of the navigational data to a user, such as the names of the various media contents stored on the DVD, or available language options for audio and subtitles. Another task of the navigator 1232 is audio/video synchronization, since the audio and video datastreams are separated by the parser/demultiplexer 1228 and, hence, in principle, independent from each other. The control components split the raw data in audio, video, sub-images and navigational portions which are used to control the DVD menu and the entire playback process by means of the DVD navigator. A part of the navigator 1232 is furthermore the audio/video synchronizer. A plurality of audio and video decoders, finally process the audio and video portions, of which the DVD content is composed.

The parser/demultiplexer 1228 sends audio packs to an audio decoder 1234 that is typically capable of decoding audio data according to a plurality of audio codec standards. The audio decoder 1234 belongs to the "audio decoding" functional group of the master/slave video player. Video packs are sent by the parser/demultiplexer 1228 to the latency compensator 1238 and also to the encryptor 1250. The latency compensator 1238 sends a latency-compensated video stream to a video decoder 1240 which belongs to the functional group "video processing" and comprises, in the illustrated embodiment, an MPEG2 decoder 1242, a sub-images decoder 1244, and a mixer 1246. The decoded video stream is then output to a local display of the master element 110. Except for the latency-compensator 1238, the components of the master/slave video player illustrated in FIG. 12 and described thus far, correspond to the components of the standard video player.

For the purposes of the teachings disclosed herein, the standard functionality of a standard video player is extended, as for a master/slave player not only one video stream needs to be synchronized to an audio signal, but several video streams. This may be achieved by first synchronizing the video streams with respect to each other in order to obtain a frame-synchronous presentation on several displays. Furthermore, in the case of high-quality 24-bit multichannel audio, the decoded PCM audio data (PCM: pulse code modulation) need to be encrypted by means of the DTCP (Digital Transmission Content Protection) algorithm.

In order not to infringe the DVD standard, the video and sub-image streams need to be (re-)encrypted, as well. To this end, the two encryptors 1236 and 1250 are provided in the master element 110. Both encryptors 1236 and 1250 belong the functional group "data input/output". The encryptor 1236 is connected to an output of the audio decoder 1234, and receives control signals from the navigator 1232. The re-encrypted audio data is output by the encryptor 1236 for further processing and/or transmission over a network to the slave elements 112. The encryptor 1250 is connected to an output of the parser/demultiplexer 1228, as the video data will be decoded by the slave element(s), anyway. Thus, the video packs provided by the parser/demultiplexer 1228 are encrypted by the encryptor 1250 and sent over the network 120 to the slave element 112. Since the video content is stored or transmitted in the video pack in a highly compressed format, transmitting the video pack over the network 120 needs only a fraction of network bandwidth of what would be needed for transmitting the decoded video data over the network 120. In other words, network bandwidth can be economized by moving the video decoding from the master element to the slave element(s), in case the presentation of the video data at the slave element(s) is desired.

The master element 110 or master player (MP) represents an extension of a standard DVD player. In particular, the latency compensator 1238 may be implemented as a variable buffer for delaying the master element-sided video contents. The navigator 1232 is extended by an additional input for alternative control through the slave element 112 or slave player (SP). The A/V synchronizer may consider a frame ID of the slave element 112 in the synchronization in addition to a local frame ID. Furthermore, it may delay, by means of the latency compensator 1238, the video decoding of the master element 110 by the travelling time of the MOST transmission over the network 120 and for balancing jitter effects in a dynamic manner. Another task of the master element 110 may be to bundle the video and sub-images contents to an MPEG2 transport stream and to transmit this transport stream in an encrypted manner to the slave element 112.

The slave player or slave element 112 may be a pure video processor without audio processing capabilities and substantially represent a subset of a standard DVD player. Driven by the MOST bus, the video contents of the MPEG2 transport stream and—in the case of DVD video playback—the subtitle and menu contents are decoded within the slave element 112. Both results may be computationally combined by a video mixer 1276 in a pixel-wise manner and yield the video frames that are suitable for presentation on a video display.

In a closed control loop for video/video and audio/video synchronization within the master element 110, the current frame ID of the slave element 112 is transmitted to the master element 110. The master element 110 may thus control the video delay within the latency compensator 1238 in an appropriate manner.

In order to fulfill these tasks, the slave element 112 comprises a decryptor 1260 (belonging to the "data input/output" group), a parser/demultiplexer 1262 (belonging to the "control" group), and a video decoder 1270 (belonging to the "video processing" group). The decryptor 1260 may be regarded as a complement to the encryptor 1250 of the master element 110. At an output of the decryptor 1260 the video tags extracted by the master element's parser/demultiplexer 1228 are available and sent to the optional parser/demultiplexer 1262 of the slave element 112. The parser/demultiplexer 1262 of the slave element 112 may be provided for the case in which the slave element 112 is used to play media content from a local source, i.e. in a scenario where the slave element 112 actually behaves like a standard DVD player (or as a video player for other formats of video files that may be stored on e.g. a USB stick).

The slave element 112 also comprises a human machine interface 1264 (possibly identical to the human machine interface 837 of the implementation shown in FIG. 8). For the control of the slave element 112 by the corresponding user, control commands can be input by means of suitable control elements or a graphical user interface (GUI). In the case of a distributed playback, the control commands are not evaluated within the slave element 112, but are transmitted to the master element 110 via a remote control channel. Depending on the implementation, it may not be distinguishable for the master element 110 as to whether a command has been generated locally or at the slave element 110.

Due to the MOST network, it is only needed to decode the audio contents once. In order to facilitate A/V synchronization, the A/V synchronization may be performed within the master element 110. The distribution of the decoded audio contents to the various consumers such as the passenger cabin amplifier, headphones 234, etc., occurs via the standard mechanism of the MOST architecture. This is possible as even audio data in CD audio disc quality only needs a bandwidth of 1.41 Mbt/s, which is easily feasible with a MOST network.

The master/slave architecture according to the teachings disclosed in this document may be used in different dynamic application scenarios. Referring back to FIG. 2, the entertainment system in an automobile can be implemented in a symmetric manner which means that both, the front unit and the rear unit may assume the role of the master element 110 or the slave element 112, respectively, in an alternating manner. Some application scenarios resulting from this symmetry are illustrated in FIGS. 13 to 18, and described below.

Figure 13:
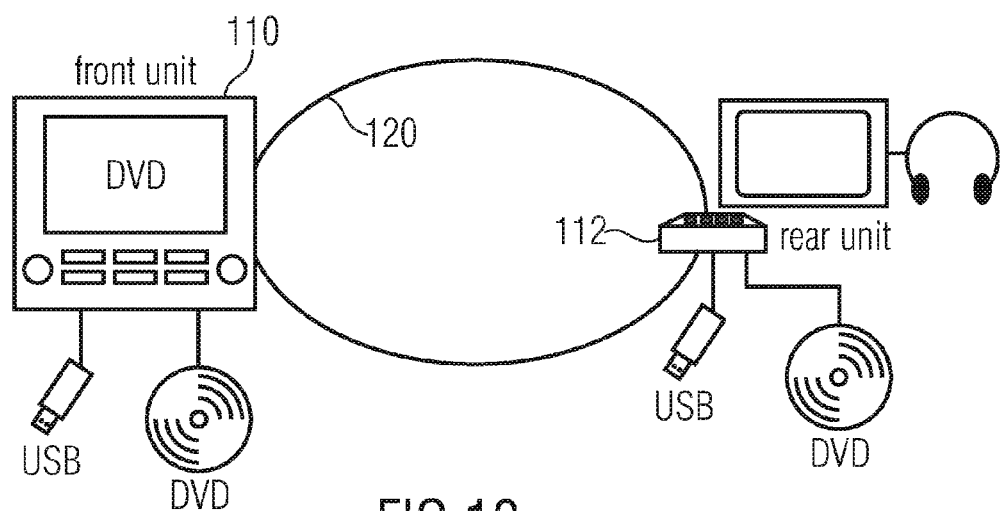
FIGS. 13 to 18 show different application scenarios for a distributed playback architecture.

Master only: this is the standard case of a video player (FIG. 13). Since also the slave element is a portion of a complete video player including an audio decoder, it is possible to play back a local payload source and present it on a local display in an independent manner on both, the front units and the rear unit, with a master player of their own.

Figure 14:
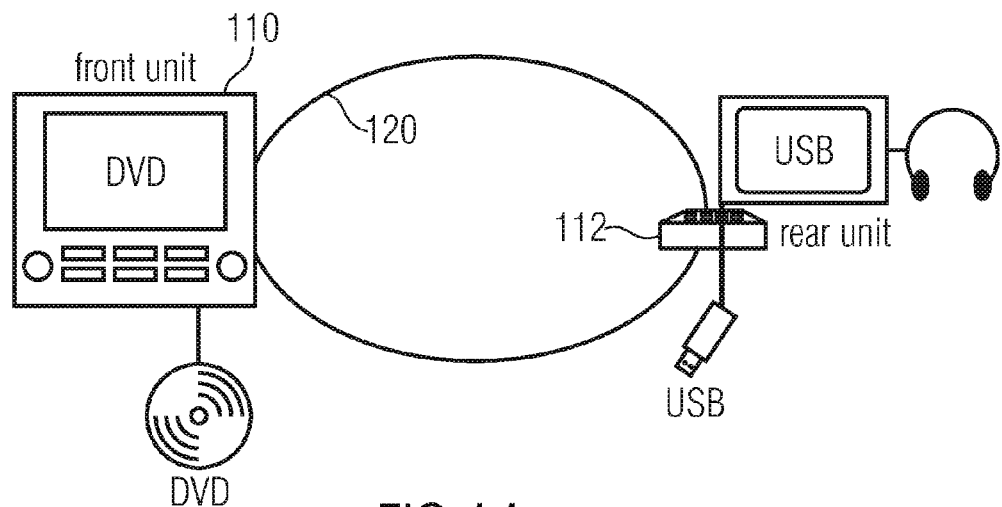
Figure 15:
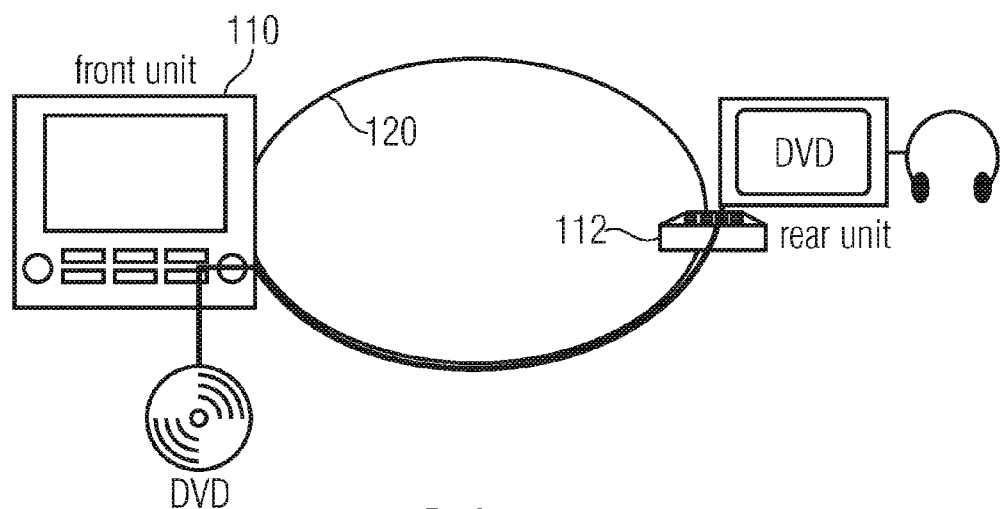

Slave only: a DVD inserted in the front unit (master) is decoded in a rear unit (slave), as illustrated in FIG. 14. Audio decoding and A/V synchronization are performed by the master element 110; video decoding and display are performed by the slave 112. The playback control occurs via the remote control channel and the MOST. The master 110 sends the video contents of the storage medium after de-multiplexing to the slave 112. This requests a re-assembly into an MPEG2 and transport stream. In addition, not only the I-frames (part of the standard in the case of DVD) are provided with frame IDs, but also the T-frames and B-frames.

Master/slave: This scenario (see FIG. 15) is an extension of the slave-only application, because now the master player also performs the video decoding and video display. Typically, master and slave are fully controllable in this scenario. Thus, the control of the DVD is done according to common multipoint arbitration methods, such as "last-command-wins". From the perspective of the slave element 112, the scenarios slave-only and master/slave are substantially identical.

Figure 16:
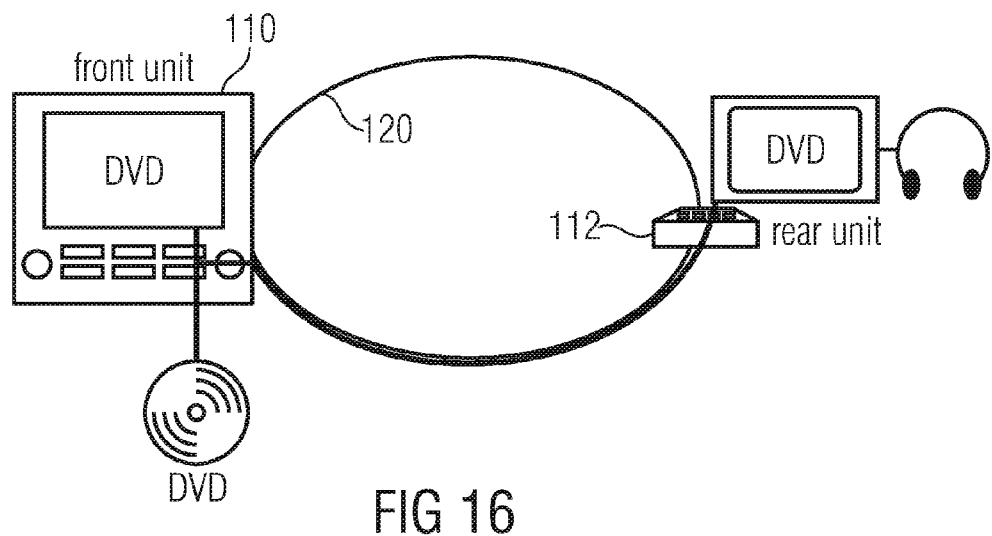

Dynamic transitions: Dynamic transitions may need particular attention, for example, between a slave-only mode and a master/slave mode. This is schematically illustrated in FIG. 16. The viewer at the master element 110 chooses a local video source, e.g. a DVD video, while another viewer at the slave element 112 has already occupied this source in a slave-only mode. In this case, the video output (including any decoding and/or processing needed to this end) is also activated in the master element 110, so that both users view the same, frame-synchronous video content on their respective displays. If needed, the decoded audio signal is also forwarded to the vehicle interior amplifier 222 (passenger cabin amplifier), in addition to being forwarded to the headphones.

Figure 17:
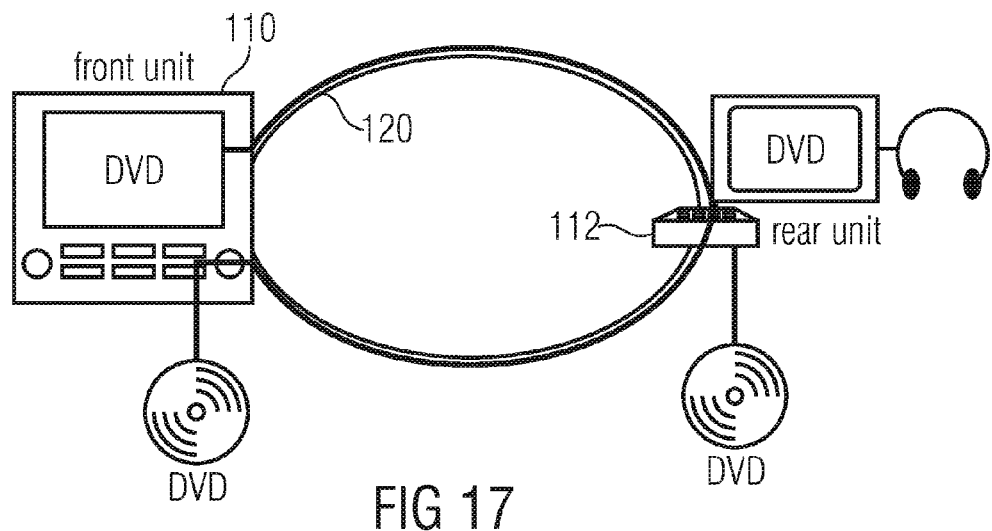
Figure 18:
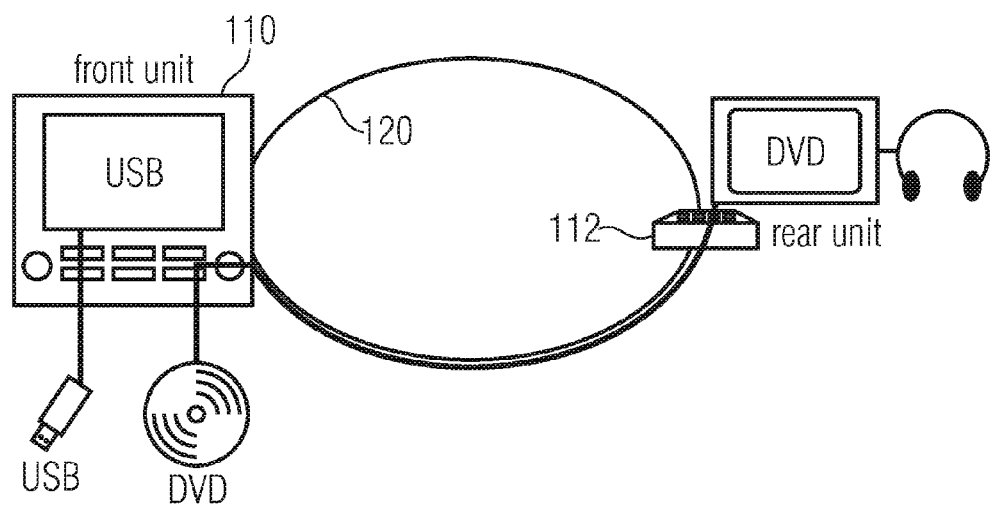

Parallel operation: Current software architectures and frameworks make it possible that even extensive multimedia middle ware such as the multimedia engine (MME) may be instantiated several times (multiple instantiation) in an efficient manner. The hardware on which the software architecture and framework runs may be based on Intel's Atom platform which offers sufficient performance to decode and process two independent video sources in parallel (standard resolution). In this manner, also complex application scenarios may be realized (see FIG. 17). The scenario illustrated by FIG. 17 is as follows: Assume the distributed playback architecture initially runs in slave-only mode. A second instance of the player is created and thus a second video source, such as a USB medium can be played back by the master, while the DVD drive is at the same time available for the slave player.

Cross-over operation: As the transmission of DVD contents is limited to a maximal bandwidth of 12 Mbit/s, two independent master/slave scenarios may be realized in a cross-over manner (see FIG. 18). In each unit (front and rear) both a master element and a slave element is instantiated. In this application scenario the front user uses a video source inserted at the rear unit, while the rear user simultaneously views a video source inserted in the front unit.

The proposed architecture of a master/slave video player meets the increased requirements to a flexible and standardized video distribution for future infotainment systems in, for example, automobiles. A consistent separation of master components and slave components facilitate the realization of a number of requirements requested by potential buyers of infotainment systems, such as car manufacturers. Without the consistent separation in master and slave components, these requirements could be difficult to implement. An isochronous transmission channel provided for by the MOST150 standard facilitates the network connection in comparison to the synchronous approach, because in the case of video signals having low bandwidth, it is not needed to fill the non-allocated maximal bandwidth with empty packets (padding). An extension of the master/slave approach to Blu-ray formats is imaginable. Another option is to transmit JAVA-based contents of BD-J titles.

In summary, a possible implementation of distributed playback comprises a number of methods, summarized below:
- The master is able to transmit to each slave, or broadcast to all, the media payload, playback control commands, and beacon packets at regular time intervals.
- Each slave is able to receive, decode and render the media payload.
- Each slave, on receipt of a beacon packet, sends an acknowledgement to the master, thus allowing the master to know of the presence of each slave on the network, and the network latency of each slave. All slaves can then synchronize their clocks to the master, enabling synchronized presentation of the media payload and synchronized execution of playback control commands.
- On joining the network, each slave is able to request re-transmission of previously transmitted payload packets from a given position in time—timestamp, enabling a slave to decode and present identical content to that currently presented on the master.
- Each slave is able to detect packets lost in transmission, and request re-transmission of lost packets.
- Each slave is optionally able to transmit user operations or playback control commands to the master, and the master is able to arbitrate between commands received from multiple slaves.

The following sections provide further information, optional details, and aspects of the teachings disclosed herein.

Network Considerations

Distributed Playback requests that master and slave communicate by means of a network protocol. The specific protocol used is beyond the scope of this document. If a connectionless protocol such as UDP (User Datagram Protocol) is used, the master may be able to broadcast data simultaneously to all slaves, thus saving considerable network bandwidth in multiple slave scenarios. In this case, the number of slaves may be largely unconstrained by available network bandwidth. On the other hand, for connection-based protocols such as TCP it may be necessitated for the master to transmit separately to each slave.

Distributed Playback may necessitate that each slave is capable of transmitting feedback packets, and optionally playback control commands, to the master, although it is not a requirement that the same physical network be used for these purposes. Slave feedback is typically of much lower bandwidth, consisting primarily of small requests and acknowledgement packets.

Distributed Playback is designed to be robust, and packet loss is tolerated. Re-transmission of lost packets does however consume network bandwidth, so it is important that the master does not become overwhelmed with requests for lost packets to the extent that it is no longer capable of transmitting the media payload in time for decode and subsequent presentation. If available network bandwidth is insufficient, Distributed Playback allows a master to ignore requests for re-transmission, in which case a slave may halt presentation until it receives enough media payload to continue.

Network Bandwidth

Network bandwidth is efficiently utilized by transmitting the media payload in its original encoded form, e.g. as read from file or disc (optionally with an additional layer of encryption such as, but not limited to, DTCP). The media payload typically consists of one or more interleaved streams, all or any of which may be presented by the slave. Distributed Playback does not define or impose any restrictions on what may be contained within the media payload. For example, the payload may consist of raw CD sectors, encrypted DVD program streams, DTV transport streams, or any other playable media content.

Playback control commands, for example to pause, stop, flush or change the playback speed, are also expected to be transmitted from master to slave. The nature and scope of such commands is media and implementation specific, and apart from common examples, beyond the scope of this document. Such commands are here-on considered as part of the media payload, typically contained within a private data stream. This is however not a strict requirement of Distributed Playback, and where appropriate, control commands may be transmitted as separate identifiable packets, or as part of the beacon packet.

Available network bandwidth may be high enough to handle the original media payload, plus the overhead of encryption if necessitated, plus the overhead of master and slave connection and synchronization protocols, control commands, and in case of packet loss, re-transmission of lost packets. In general, it is expected that all such overheads are insignificant with respect to the bandwidth necessitated for the media payload itself.

| MEDIA TYPE | BANDWIDTH NECESSITATED |
| --- | --- |
| Blu-ray Disc | 54.0 Mbps |
| DVD Video Disc | 10.1 Mbps |
| CD Audio Disc | 1.41 Mbps |
| MP3 File | 0.32 Mbps |

The bitrates necessitated for various media are shown above. Assuming no significant bandwidth overhead due to packet loss or other factors, Distributed Playback of the highest bitrate media, e.g. Blu-ray content at 54 Mbps, is entirely feasible on a standard 100 Mbps LAN.

Network Latency & Synchronization

Distributed Playback enables the synchronized presentation of media content. Interpreting this in the strictest possible sense, it means that at any instant in time, both master and slave are capable of displaying exactly the same video pictures and rendering exactly the same audio samples (note, depending on implementation requirements, it may not be needed to transmit audio to the slave devices).

Distributed Playback defines a synchronization protocol based on beacon packets and acknowledgements which enables the accurate synchronization of both (a) presentation of media content and (b) execution of playback control commands, in multi-slave scenarios, where each slave may have different and variable network latencies.

In order for this to be achieved, two requirements should be met:
  Master and slave clocks can be accurately synchronized (requirement may be relaxed for certain implementations).
  Playback control commands (e.g. PAUSE and RESUME) can be delayed, in order that they can be executed simultaneously on master and slave.

The second requirement is particularly important for commands such as PAUSE, since it takes time (equal to the network latency) for a command to be transmitted from master to slave. It is however desirable that both master and slave stop playback at the same location within the media content, and display identical content while paused.

Distributed Playback typically does NOT define exactly how clocks are to be synchronized, which may depend on the target implementation, or how delayed execution of playback control commands is to be technically implemented, with its potentially complex state changes and user-interface ramifications. Delayed command execution is regarded as a needed complexity, as a consequence of necessitating accurate synchronization over a network with unavoidable latency. If the latency is somehow minimized to an imperceptible degree (e.g. less than the duration of a single video picture), and/or the strict requirement for picture-accurate synchronization is relaxed, then delayed command execution may not be needed.

Master & Slave Protocol

The master continuously transmits or broadcasts the media payload, interleaved with beacon packets at regular intervals. The exact form of each packet may be constrained by network protocol or other design requirements, and may additionally contain error correction codes or layers of encryption which are beyond the scope of this document.

To compensate for network and decode latencies, and to provide a degree of robustness against packet loss or other eventualities, the media payload is typically transmitted considerably in advance of its presentation time. Both master and slave are to be capable of buffering sufficient payload to accommodate this difference. This does however present a problem: when a slave initially joins the network, it will receive only payload packets intended to be presented at some time in the future. Depending on system requirements, network conditions, and the size of buffering involved, it may be acceptable for the slave to wait until the presentation time of the currently received packets, and present either alternative content, or no content, until this time is reached. Otherwise, Distributed Playback protocol allows for a slave, on initial connection, to request re-transmission of payload packets prior to those currently being received, enabling it to present content sooner.

The frequency with which beacon packets are interleaved with payload packets is not defined, but since it affects the speed at which a slave can connect to the master and begin presentation of the media payload, it should be fairly high, e.g. several times per second.

Playback States & Commands

In addition to the media payload, it is usually necessitated for the master to transmit the current playback state, so that it can be reproduced in a synchronized manner on all slaves. The playback state includes the current playback speed, which may be zero (PAUSED) or negative (BWD playback). It may also include STOP or FLUSH commands, stream or button selections, chapter numbers, and various metadata.

Distributed Playback does not define or restrict the number and type of playback states, which may depend largely on the media type and system requirements. Playback speed and FLUSH states are discussed in this document and are typically necessitated for most media playback implementations. Other playback states are assumed to be handled in a similar way.

Distributed Playback may necessitate that all playback states are controlled by the master, and transmitted from master to slave. If it is necessitated that playback can be controlled by a slave, i.e. by allowing some degree of interactivity on a slave device, then the slave is to first transmit an appropriate playback control command to the master, which in turn transmits to all slaves. Playback states may be transmitted from master to slave actively in the form of commands, or passively as extra fields in a beacon packet, or both. The latter approach provides some degree of robustness, since packets containing active commands may be lost, or not received by all slaves. If the current playback state is regularly transmitted to all slaves as extra fields in the beacon packet, then a slave may gracefully recover from lost packets.

Packet Types

At least on some implementations, distributed playback necessitates that the master transmit payload packets and beacon packets, and that a slave can distinguish between them. Other packet types may also be interleaved with the transmission, as long as they can be correctly distinguished.

Playback Control Commands

A method is described here by which means the current playback speed can be changed simultaneously on the master and all slaves. By changing the playback speed, it is possible to affect synchronized PAUSE and RESUME, in addition to slow or fast FWD and BWD playback.

At any point in time, the master is aware of each slave's network latency. Therefore, the master knows by how much a command should be delayed, in order that it can be executed simultaneously on the master and all slaves. The delay should be equal (or slightly greater) to the latency of the highest latency slave. When the delay has been determined, a regular beacon packet is transmitted to all slaves, with additional fields indicating a future reference time, a future PTS and a future playback speed. The future reference time is the time on the master clock at which the playback speed should be applied, equal to the current reference time on the master plus the calculated delay. On receipt of the beacon packet, a slave can immediately determine the time, on its own clock, at which the future PTS and playback speed should be applied. This is equal to the current time, plus the difference between the future and current reference times recorded in the beacon packet, minus the latency for that slave. By this means, each slave can receive the playback control command, and perform its own delayed execution of the command, such that the command is executed simultaneously on the master and all slaves.

If the packet containing the playback control command is lost, or not received by a slave for some reason, a slave will be able to detect this when it receives the next beacon packet, since the playback speed and current presentation time is encoded in all beacon packets. In this case, a slave may belatedly set its playback speed, and adjust its presentation clock, in order to regain the lost synchronization.

Flush Commands

In addition to changing the playback speed, it is often necessitated to stop playback and FLUSH. This may occur, for example, if the user aborts playback, or while seeking to a new position within the media payload. Since the payload is typically transmitted considerably in advance of the current presentation time, it is preferable to discard this buffered data and stop the current presentation immediately, rather than wait until all buffered data has been fully played.

This may be achieved by transmitting a FLUSH command to all slaves, either embedded in a regular beacon packet, or as a separate packet type. On receipt of the FLUSH, each slave is expected to stop playback of the current payload, and discard any buffered data. It is not usually necessitated that this operation be exactly synchronized on the master and all slaves, so it should not be needed to delay execution of the FLUSH in the same way as for PAUSE and RESUME commands.

If the packet containing the FLUSH command is lost, or not received by a slave for some reason, it should still be possible to determine that a FLUSH occurred. This may be achieved, for example, by incrementing the high order bits of the payload sequence number. On receipt of the next payload packet, a slave can easily determine that it is not continuous with the previous and that a flush is to have occurred.

Slave Requests and Slave Playback Control Commands

In addition to beacon acknowledgement packets, a slave may transmit other information:

- A request for re-transmission of lost packets. A range of payload sequence numbers may be specified, indicating the payload packets which were lost. Note that depending on network conditions or other factors, sending the request does not guarantee that the lost packets will be re-transmitted.
- A request for re-transmission of packets, starting from a specified PTS, up to a specified sequence number. This request is typically made when a slave initially joins the network, and enables the slave, on receipt of the re-transmitted packets, to present the same content as currently presented on the master. Sending the request does not guarantee that the packets will actually be re-transmitted, in which case there may be some delay until the slave can begin presenting the current media payload.
- Playback control operations. Depending on design requirements, it may be essential for slaves to transmit to the master user operations, e.g. pause and resume, or button clicks, thus enabling playback on the master to be interactively controlled by each slave. In this case, the master typically responds to a command the same as if the command originated from the master device itself, e.g. by pausing playback, and transmitting the pause to all slaves.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray Disc, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A master element for a distributed playback architecture for media data, comprising:
    a payload data source for providing payload data packets;
    a beacon packet creator for creating beacon packets useable for synchronizing a playback process of the payload data packets at at least one slave element in the distributed playback architecture;
    a network interface for transmitting an interleaved packet stream to the at least one slave element, the interleaved packet stream comprising the payload data packets provided by the payload data source and the beacon packets created by the beacon packet creator;
    a response packet evaluator for evaluating response packets issued by the at least one slave element in response to the beacon packet by determining a network latency between a first time instant at which a particular beacon packet was transmitted by the master element and a second time instant at which the particular beacon packet was received by the slave element, wherein the response packet evaluator is adapted to measure a total roundtrip time between the first time instant and a third time instant at which a corresponding response packet was received at the master element; and wherein the response packet evaluator is further adapted to determine the network latency on the basis of the measured total roundtrip time;
    wherein the beacon packet creator is adapted to comprise the determined network latency for the at least one slave element in a subsequent beacon packet,
    wherein the payload data packets represent the media data,
    wherein the beacon packets comprise a respective reference clock time being the respective time on a clock of the master element when the respective beacon packet is transmitted by the master element,
    wherein a particular response packet issued in response to a particular beacon packet as an acknowledgement comprises the reference clock time of the particular beacon packet and a unique identifier identifying the at least one slave element having issued the particular response packet,
    wherein the response packet evaluator is adapted to measure a total roundtrip time for the at least one slave element identified by the unique identifier between a first time instant being the reference clock time included in the particular response packet and a third time instant at which the particular response packet was received at the master element, and
    wherein the response packet evaluator is further adapted to determine a network latency for the at least one slave element identified by the unique identifier between the first time instant and a second time instant at which the particular beacon packet was received by the slave element on the basis of the measured total roundtrip time.

2. The master element according to claim 1, wherein the response packet evaluator is adapted to extract an arrival time indication from the response packet, the arrival time indication indicating the second time instant and having been added to the response packet by the slave element.

3. The master element according to claim 1, wherein the response packet evaluator is further arranged to establish a list indicating the slave elements that have sent response packets during a preceding, predetermined time span period.

4. The master element according to claim 3, wherein the list further indicates a network latency for at least one of the plurality of slave elements mentioned in the list, and wherein the beacon packet creator is arranged for comprising the list in a subsequent beacon packet.

5. The master element according to claim 1, further comprising a presentation time scheduler adapted to determine an earliest possible presentation instant for the at least one slave element and a particular payload data packet.

6. The master element according to claim 5, wherein the determination of the earliest possible presentation instant is based on a maximal network latency for the at least one slave element or for a plurality of slave elements.

7. The master element according to claim 1, wherein the beacon packet creator is arranged to create beacon packets at regular time intervals.

8. The master element according to claim 1, further comprising an arbitrator for arbitrating a plurality of playback control commands issued by the at least one slave element.

9. A distributed playback architecture comprising a master element and a slave element, the master element comprising
    a payload data source for providing payload data packets;
    a beacon packet creator for creating beacon packets useable for synchronizing a playback process of the payload data packets at at least one slave element in the distributed playback architecture; and
    a network interface for transmitting an interleaved packet stream to the at least one slave element, the interleaved packet stream comprising the payload data packets provided by the payload data source and the beacon packets created by the beacon packet creator;
    a response packet evaluator for evaluating response packets issued by the at least one slave element in response to the beacon packet by determining a network latency between a first time instant at which a particular beacon packet was transmitted by the master element and a second time instant at which the particular beacon packet was received by the slave element, wherein the response packet evaluator is adapted to measure a total roundtrip time between the first time instant and a third time instant at which a corresponding response packet was received at the master element; and wherein the response packet evaluator is further adapted to determine the network latency on the basis of the measured total roundtrip time;
    wherein the beacon packet creator is adapted to comprise the determined network latency for the at least one slave element in a subsequent beacon packet
    the slave element comprising:
    a network interface for receiving an interleaved data stream comprising payload data packets and beacon packets transmitted from a master element of the distributed playback architecture;

a beacon packet extractor for extracting the beacon packets from the interleaved datastream; and a beacon packet evaluator for evaluating a transmission time indication within the beacon packet, the transmission time indication being indicative of a first time instant at which a particular beacon packet comprising the transmission time indication was transmitted by the master element, and for determining a network latency between the master element and the slave element on the basis of the transmission time indication by extracting the network latency indication from the beacon packet indicative of an approximate network latency between the master element and the slave element corresponding to a roundtrip time of a preceding beacon packet and a corresponding preceding response packet, wherein the beacon packet evaluator is further adapted to adjust a presentation time instant for a payload packet on the basis of the network latency indication;

a response packet creator for creating a response packet;

wherein the network interface is arranged to transmit the response packet to the master element in response to the particular beacon packet, wherein the payload data packets represent the media data, wherein the beacon packets comprise a respective reference clock time being the respective time on a clock of the master element when the respective beacon packet is transmitted by the master element, wherein a particular response packet issued in response to a particular beacon packet as an acknowledgement comprises the reference clock time of the particular beacon packet and a unique identifier identifying the at least one slave element having issued the particular response packet, wherein the response packet evaluator is adapted to measure a total roundtrip time for the at least one slave element identified by the unique identifier between a first time instant being the reference clock time (321) included in the particular response packet and a third time instant at which the particular response packet was received at the master element, and wherein the response packet evaluator is further adapted to determine a network latency for the at least one slave element identified by the unique identifier between the first time instant and a second time instant at which the particular beacon packet was received by the slave element on the basis of the measured total roundtrip time.

10. A method for synchronized playback in a distributed playback architecture comprising a master element and at least one slave element, the method comprising:

providing a plurality of payload data packets from a payload data source;

creating at least one beacon packet useable for synchronizing the synchronized playback of the plurality of payload packets at the at least one slave element;

interleaving the at least one beacon packet with the plurality of payload packets to form an interleaved datastream;

transmitting the interleaved datastream over a network to the at least one slave element receiving the interleaved datastream at the at least one slave element;

extracting the at least one beacon packet from the interleaved datastream;

sending a response packet from the at least one slave element to the master element in response to the beacon packet;

determining, at the master element, a network latency between the master element and the slave element on the basis of the transmission time indication by measuring a total roundtrip time between the first time instant and a third time instant at which the corresponding response packet was received at the master element;

comprising the determined network latency for the at least one slave element in a subsequent beacon packet, wherein the payload data packets represent the media data, wherein the beacon packets comprise a respective reference clock time being the respective time on a clock of the master element when the respective beacon packet is transmitted by the master element, wherein a particular response packet issued in response to a particular beacon packet as an acknowledgement comprises the reference clock time of the particular beacon packet and a unique identifier identifying the at least one slave element having issued the particular response packet, wherein a total roundtrip time for the at least one slave element identified by the unique identifier between a first time instant being the reference clock time included in the particular response packet and a third time instant at which the particular response packet was received at the master element is measured by the master element, and wherein a network latency for the at least one slave element identified by the unique identifier between the first time instant and a second time instant at which the particular beacon packet was received by the slave element is determined by the master element on the basis of the measured total roundtrip time.

11. Non-transitory storage medium comprising stored thereon a computer program comprising a program code for performing, when running on a computer, a method for synchronized playback in a distributed playback architecture comprising a master element and at least one slave element, the method comprising:

providing a plurality of payload data packets from a payload data source;

creating at least one beacon packet useable for synchronizing the synchronized playback of the plurality of payload packets at the at least one slave element;

interleaving the at least one beacon packet with the plurality of payload packets to form an interleaved datastream;

transmitting the interleaved datastream over a network to the at least one slave element receiving the interleaved datastream at the at least one slave element;

extracting the at least one beacon packet from the interleaved datastream;

sending a response packet from the at least one slave element to the master element in response to the beacon packet;

determining, at the master element, a network latency between the master element and the slave element on the basis of the transmission time indication by measuring a total roundtrip time between the first time instant and a third time instant at which the corresponding response packet was received at the master element;

comprising the determined network latency for the at least one slave element in a subsequent beacon packet, wherein the payload data packets represent the media data, wherein the beacon packets comprise a respective reference clock time being the respective time on a clock of the master element when the respective beacon packet is transmitted by the master element, wherein a particular response packet issued in response to a particular beacon packet as an acknowledgement comprises the reference clock time of the particular beacon packet and a unique identifier identifying the at least one slave element having issued the particular response packet, wherein a total roundtrip time for the at least one slave element identified by the unique identifier between a first time instant being the reference clock time included in the particular response packet and a third time instant at which the particular response packet was received at the master element is measured by the master element, and wherein a network latency for the at least one slave element identified by the unique identifier between the first time instant and a second time instant at which the particular beacon packet was received by the slave element is determined by the master element on the basis of the measured total roundtrip time.

12. Method of operating a master element for a distributed playback architecture for media data, comprising:
   providing payload data packets;
   creating beacon packets useable for synchronizing a playback process of the payload data packets at at least one slave element in the distributed playback architecture;
   transmitting an interleaved packet stream to the at least one slave element, the interleaved packet stream comprising the payload data packets provided by the payload data source and the beacon packets created by the beacon packet creator;
   evaluating response packets issued by the at least one slave element in response to the beacon packet by determining a network latency between a first time instant at which a particular beacon packet was transmitted by the master element and a second time instant at which the particular beacon packet was received by the slave element, wherein the evaluating comprises measuring a total roundtrip time between the first time instant and a third time instant at which a corresponding response packet was received at the master element; and wherein evaluating further comprises determining the network latency on the basis of the measured total roundtrip time; and
   wherein the creating comprises introducing the determined network latency for the at least one slave element in a subsequent beacon packet, wherein the payload data packets represent the media data, wherein the beacon packets comprise a respective reference clock time being the respective time on a clock of the master element when the respective beacon packet is transmitted by the master element, wherein a particular response packet issued in response to a particular beacon packet as an acknowledgement comprises the reference clock time of the particular beacon packet and a unique identifier identifying the at least one slave element having issued the particular response packet, wherein a total roundtrip time for the at least one slave element identified by the unique identifier between a first time instant being the reference clock time included in the particular response packet and a third time instant at which the particular response packet was received at the master element is measured by the master element, and wherein a network latency for the at least one slave element identified by the unique identifier between the first time instant and a second time instant at which the particular beacon packet was received by the slave element is determined by the master element on the basis of the measured total roundtrip time.

13. Non-transitory storage medium comprising stored thereon a computer program comprising a program code for performing, when running on a computer, a method of operating a master element for a distributed playback architecture for media data, the method comprising:
   providing payload data packets;
   creating beacon packets useable for synchronizing a playback process of the payload data packets at at least one slave element in the distributed playback architecture;
   transmitting an interleaved packet stream to the at least one slave element, the interleaved packet stream comprising the payload data packets provided by the payload data source and the beacon packets created by the beacon packet creator;
   evaluating response packets issued by the at least one slave element in response to the beacon packet by determining a network latency between a first time instant at which a particular beacon packet was transmitted by the master element and a second time instant at which the particular beacon packet was received by the slave element, wherein the evaluating comprises measuring a total roundtrip time between the first time instant and a third time instant at which a corresponding response packet was received at the master element; and wherein evaluating further comprises determining the network latency on the basis of the measured total roundtrip time;
   wherein the creating comprises introducing the determined network latency for the at least one slave element in a subsequent beacon packet, wherein the payload data packets represent the media data, wherein the beacon packets comprise a respective reference clock time being the respective time on a clock of the master element when the respective beacon packet is transmitted by the master element, wherein a particular response packet issued in response to a particular beacon packet as an acknowledgement comprises the reference clock time of the particular beacon packet and a unique identifier identifying the at least one slave element having issued the particular response packet, wherein a total roundtrip time for the at least one slave element identified by the unique identifier between a first time instant being the reference clock time included in the particular response packet and a third time instant at which the particular response packet was received at the master element is measured by the master element, and wherein a network latency for the at least one slave element identified by the unique identifier between the first time instant and a second time instant at which the particular beacon packet was received by the slave element is determined by the master element on the basis of the measured total roundtrip time.

* * * * *